(12) United States Patent
Oda et al.

(10) Patent No.: US 9,017,871 B2
(45) Date of Patent: Apr. 28, 2015

(54) NEGATIVE-ELECTRODE TERMINAL FOR CELL

(75) Inventors: Yoshimitsu Oda, Suita (JP); Masaaki Ishio, Tokyo (JP)

(73) Assignees: Neomax Materials Co., Ltd., Suita-shi (JP); Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/236,289

(22) PCT Filed: Aug. 1, 2012

(86) PCT No.: PCT/JP2012/069625
§ 371 (c)(1),
(2), (4) Date: Jan. 30, 2014

(87) PCT Pub. No.: WO2013/018841
PCT Pub. Date: Feb. 7, 2013

(65) Prior Publication Data
US 2014/0178755 A1      Jun. 26, 2014

(30) Foreign Application Priority Data

Aug. 4, 2011   (JP) .................................. 2011-171270

(51) Int. Cl.
*H01M 2/30*      (2006.01)
*H01M 2/02*      (2006.01)
(Continued)

(52) U.S. Cl.
CPC ................ *H01M 2/30* (2013.01); *H01M 2/024* (2013.01); *H01M 2/06* (2013.01); *H01M 2/206* (2013.01); *H01M 2/263* (2013.01); *H01M 2/305* (2013.01)

(58) Field of Classification Search
CPC .......... H01M 2/20; H01M 2/202; H01M 2/30
See application file for complete search history.

(56) References Cited

U.S. PATENT DOCUMENTS

2009/0104520 A1*   4/2009   Marple .................... 429/164
2010/0081048 A1*   4/2010   Nansaka et al. ............ 429/158
(Continued)

FOREIGN PATENT DOCUMENTS

JP      2001-6746 A      1/2001
JP      2001-35475 A     2/2001
(Continued)

OTHER PUBLICATIONS

"Adjacent." Merriam-Webster.com. Merriam-Webster, n.d. Web. Oct. 3, 2014. <http://www.merriam-webster.com/dictionary/adjacent>.*
International Search Report dated Oct. 2, 2012 issued in corresponding application No. PCT/JP2012/069625.

*Primary Examiner* — Alix Echelmeyer
(74) *Attorney, Agent, or Firm* — Westerman, Hattori, Daniels & Adrian, LLP

(57) ABSTRACT

A negative-electrode terminal for a cell in which separation between a first metal layer and a second metal layer hardly takes place is provided by suppressing excess formation of an intermetallic compound on a bond interface between the first metal layer and the second metal layer. This negative-electrode terminal for a cell includes a clad portion formed by bonding a first metal layer made of Al or an Al alloy and a second metal layer containing Ni and Cu and consisting of one or a plurality of layers to each other. The first metal layer includes a connected region connected with a cell terminal connecting plate and a stacked region adjacent to the connected region on the side of the same surface, while the second metal layer is bonded to the first metal layer in the stacked region and configured to be connectable to cell negative electrodes of cells.

20 Claims, 7 Drawing Sheets

(51) Int. Cl.
*H01M 2/06* (2006.01)
*H01M 2/20* (2006.01)
*H01M 2/26* (2006.01)

(56) References Cited

U.S. PATENT DOCUMENTS

2011/0081572 A1    4/2011  Byun et al.
2011/0244309 A1*  10/2011  Byun et al. .................... 429/158
2011/0293995 A1   12/2011  Sasaki et al.
2012/0021278 A1*   1/2012  Byun et al. .................... 429/179

FOREIGN PATENT DOCUMENTS

| JP | 2005-339923 A  | 12/2005 |
| JP | 2008-243719 A  | 10/2008 |
| JP | 2010-80355 A   | 4/2010  |
| JP | 2011-77039 A   | 4/2011  |
| JP | 2012-123946 A  | 6/2012  |
| WO | 2010/087472 A1 | 8/2010  |

* cited by examiner

NEGATIVE-ELECTRODE TERMINAL FOR CELL

TECHNICAL FIELD

The present invention relates to a negative-electrode terminal for a cell applicable to a lithium ion cell, for example, and more particularly, it relates to a negative-electrode terminal for a cell in which a plurality of members made of different metallic materials are bonded to each other.

BACKGROUND ART

A cell terminal, disclosed in Japanese Patent Laying-Open No. 2001-6746 (Patent Document 1), for example, in which a plurality of members made of different metallic materials are bonded to each other is known in general.

In the aforementioned Patent Document 1, there is disclosed a lithium ion cell including a cell can made of Al functioning as a positive electrode, a clad body (positive-electrode terminal) whose one surface side is welded to this cell can and whose another surface side is welded to a lead (cell terminal connecting plate) made of Ni, and a negative-electrode terminal connected to a negative electrode in a state insulated from the cell can. An Al layer and an Ni layer are bonded to each other in the clad body of this lithium ion cell, and the Al layer (first metal layer) is positioned on the cell can side, while the Ni layer (second metal layer) is positioned on the lead side. Thus, the lithium ion cell has a weld structure of the lead made of Ni larger in electric resistance than Al and the Ni layer of the clad body, whereby welding between the lead and the clad body becomes easy due to resistance welding. Although not clearly described in Patent Document 1, the clad body is conceivably in a state (overlay (OVERLAYS) shape) where the Al layer and the Ni layer are bonded to each other over the whole surfaces.

PRIOR ART

Patent Document

Patent Document 1: Japanese Patent Laying-Open No. 2001-6746

SUMMARY OF THE INVENTION

Problem to be Solved by the Invention

Assuming that the clad body is a clad body in which the Al layer and the Ni layer are bonded to each other over the whole surfaces in the lithium ion cell disclosed in Patent Document 1, however, it is conceivable that part of heat applied when welding the lead and the clad body to each other reaches a bond interface between the Al layer and the Ni layer corresponding to a portion where the lead and the clad body are welded to each other. Therefore, there is a case where an intermetallic compound containing Al and Ni is excessively formed on the bond interface between the Al layer and the Ni layer due to the heat in welding. In this case, there is such a problem that bond strength between the Al layer (first metal layer) and the Ni layer (second metal layer) lowers due to the intermetallic compound excessively formed on the bond interface and the Al layer (first metal layer) and the Ni layer (second metal layer) easily separate from each other as a result thereof.

The present invention has been proposed in order to solve the aforementioned problem, and one object of the present invention is to provide a negative-electrode terminal for a cell in which separation between a first metal layer and a second metal layer hardly takes place by suppressing excess formation of an intermetallic compound on a bond interface between the first metal layer and the second metal layer.

Means for Solving the Problem

A negative-electrode terminal for a cell according to an aspect of the present invention includes a clad portion formed by bonding a first metal, layer made of Al or an Al alloy and a second metal layer containing Ni and Cu and consisting of one or a plurality of layers to each other, while the first metal layer includes a connected region connected with a cell terminal connecting plate for connecting cell terminals of a plurality of cells with each other and a stacked region adjacent to the connected region on the side of the same surface, and the second metal layer is bonded to the first metal layer in the stacked region, and configured to be connectable to cell negative electrodes of the cells.

In the aforementioned "first metal layer" and the "second metal layer", such a structure that the second metal layer is embedded in part of the first metal layer or the like is included. In the aforementioned "connected region connected with a cell terminal connecting plate", a case of including a region actually connected with the cell terminal connecting plate and a region around the same is also included, in addition to a case of including only the region actually connected with the cell terminal connecting plate. The aforementioned "stacked region adjacent to the connected region on the side of the same surface" means that this is a region present on the side of the same surface as the connected region connected with the cell terminal connecting plate, and a region adjacent to the connected region connected with the cell terminal connecting plate and different from the connected region connected with the cell terminal connecting plate. In "on the side of the same surface", further, not only a case where the connected region and the stacked region are on the same surface (flush with each other), but also a case where the same are on the side of the same surface through a step portion or the like is also included.

In the negative-electrode terminal for a cell according to the aspect of the present invention, as hereinabove described, the first metal layer includes the connected region connected with the cell terminal connecting plate and the stacked region adjacent to the connected region on the side of the same surface and the second metal layer is bonded to the first metal layer in the stacked region so that the second metal layer is not arranged in the connected region connected with the cell terminal connecting plate, whereby heat at a time when the negative-electrode terminal for a cell and the cell terminal connecting plate are connected with each other can be inhibited from reaching a bond interface between the first metal layer and the second metal layer. Thus, an intermetallic compound containing Al and Ni can be inhibited from being excessively formed on the bond interface between the first metal layer and the second metal layer due to the heat at the time when the negative-electrode terminal for a cell and the cell terminal connecting plate are connected with each other, whereby separation between the first metal layer and the second metal layer can be rendered hard to take place.

In the negative-electrode terminal for a cell according to the aspect of the present invention, as hereinabove described, the second metal layer configured to be connectable to the cell negative electrodes is configured to contain Ni and Cu and to consist of one or a plurality of layers so that a bond structure of Al and Ni larger in bond strength than a bond structure of only Al and Cu can be formed on a bonded portion between the first metal layer and the second metal layer due to Ni in the second metal layer when forming the clad portion by bonding the first metal layer and the second metal layer to each other, whereby the first metal layer and the second metal layer can be strongly bonded to each other. Further, the electrical resistance of the second metal layer can be reduced due to Cu in the second metal layer as compared with a case where the second metal layer is constituted of only Ni larger in electrical resistance and higher in melting point than Cu, while the second metal layer and the cell negative electrodes can be connected with each other by welding or the like under a lower temperature condition.

Preferably in the negative-electrode terminal for a cell according to the aforementioned aspect, the first metal layer is configured to be connectable to the cell terminal connecting plate made of Al or an Al alloy, and the second metal layer is configured to be connectable to the cell negative electrodes made of Cu or a Cu alloy. When structured in this manner, the cell terminals of the plurality of cells can be electrically connected with each other by employing the cell terminal connecting plate made of Al or an Al alloy. At this time, Al or an Al alloy is smaller in weight than Cu or Ni which is a general material for a cell terminal connecting plate, whereby the weight of a cell assembly constituted of the plurality of cells and a plurality of cell terminal connecting plates connecting the respective cells with each other can be reduced. When configuring the second metal layer to be connectable to the cell negative electrodes made of Cu or a Cu alloy, a fragile intermetallic compound containing Al and Cu can be inhibited from being formed on the connected region, dissimilarly to a case of connecting the first metal layer made of Al or an Al alloy to the cell negative electrodes. Thus, the negative-electrode terminal for a cell and the cell negative electrodes can be strongly connected with each other.

Preferably in the negative-electrode terminal for a cell according to the aforementioned aspect, the connected region and the stacked region of the first metal layer are arranged on a side opposite to the cells. When structured in this manner, the cell terminal connecting plate can be easily connected to the first metal layer from the side opposite to the cells, while the cell negative electrodes can be easily connected to the second metal layer.

Preferably in the negative-electrode terminal for a cell according to the aforementioned aspect, the second metal layer is arranged to extend in the stacked region from one end portion up to another end portion in a second direction orthogonal to a first direction in which the connected region and the stacked region are adjacent to each other on the same surface. When structured in this manner, a plurality of negative-electrode terminals for cells can be easily obtained from one terminal material by cutting the terminal material, in which the second metal layer is extended in the stacked region to extend in the second direction, in the first direction at prescribed intervals in the second direction or the like in a case of manufacturing the plurality of negative-electrode terminals for cells from one terminal material.

Preferably in the negative-electrode terminal for a cell according to the aforementioned aspect, the second metal layer is constituted of an Ni—Cu alloy layer containing Ni and Cu. When structured in this manner, the structure of the negative-electrode terminal for a cell can be simplified dissimilarly to a case where the second metal layer contains Ni and Cu and includes a clad portion consisting of a plurality of layers.

Preferably in this case, the content of Ni in the Ni—Cu alloy layer of the second metal layer is at least 2 mass %. When structured in this manner, Al and Ni can be reliably bonded to each other on the bonded portion between the first metal layer and the second metal layer, whereby the first metal layer and the second metal layer can be more strongly bonded to each other.

Preferably in the aforementioned negative-electrode terminal for a cell in which the content of Ni in the Ni—Cu alloy layer is at least 2 mass %, the content of Ni in the Ni—Cu alloy layer of the second metal layer is at least 10 mass %. When structured in this manner, Al and Ni can be more reliably bonded to each other on the bonded portion between the first metal layer and the second metal layer, whereby the first metal layer and the second metal layer can be further strongly bonded to each other.

Preferably in the negative-electrode terminal for a cell according to the aforementioned aspect, the second metal layer includes a clad portion at least having a third metal layer made of Ni and a fourth metal layer made of Cu, and the third metal layer is arranged on a bonded portion to the first metal layer. When structured in this manner, Cu is not arranged on the bonded portion between the first metal layer and the second metal layer, whereby a bond structure of Al and Cu smaller in bond strength than a bond structure of Al and Ni can be inhibited from being formed. Further, the second metal layer includes the clad portion at least having the third metal layer made of Ni and the fourth metal layer made of Cu, whereby the third metal layer and the fourth metal layer made of different metallic materials can be strongly bonded to each other.

Preferably in this case, the thickness of the fourth metal layer is larger than the thickness of the third metal layer. When structured in this manner, the thickness of the fourth metal layer made of Cu smaller in electrical resistance and lower in melting point than Ni constituting the third metal layer can be enlarged, whereby the electrical resistance of the second metal layer can be easily reduced, while the second metal layer and the cell negative electrodes can be connected with each other by welding or the like under a low temperature condition.

Preferably in the aforementioned negative-electrode terminal for a cell in which the second metal layer includes the clad portion, the second metal layer consists of the clad portion having the third metal layer and the fourth metal layer and an Ni-plated layer formed on a side of the fourth metal layer opposite to the third metal layer. When structured in this manner, the connected region can be easily made to generate heat due to the Ni-plated layer larger in electrical resistance than the fourth metal layer made of Cu when connecting the second metal layer and the cell negative electrodes with each other by employing resistance welding. Further, light can be absorbed in a large quantity in the Ni-plated layer smaller in laser beam reflectance than the fourth metal layer made of Cu when connecting the second metal layer and the cell negative electrodes with each other by employing laser welding, whereby the connected region can be easily made to generate heat due to the Ni-plated layer. Due to these, the second metal layer and the cell negative electrodes can be easily connected with each other in a case of employing resistance welding or laser welding. Further, the fourth metal layer can be inhibited from being corroded, due to the Ni-plated layer having corrosion resistance. In addition, the Ni-plated layer may be formed with the minimum necessary thickness capable of easily making the connected region generate heat and capable of inhibiting the fourth metal layer from being corroded, whereby the quantity of use of Ni can be reduced.

Preferably in the aforementioned negative-electrode terminal for a cell in which the second metal layer includes the clad portion, the second metal layer consists of the clad portion having the third metal layer and the fourth metal layer as well as a fifth metal layer made of Ni arranged on a side of the fourth metal layer opposite to the third metal layer. When structured in this manner, the connected region can be easily made to generate heat due to the fifth metal layer made of Ni larger in electrical resistance than the fourth metal layer made of Cu when connecting the second metal layer and the cell negative electrodes with each other by employing resistance welding. Further, light can be absorbed in a large quantity in the fifth metal layer made of Ni smaller in laser beam reflectance than the fourth metal layer made of Cu when connecting the second metal layer and the cell negative electrodes with each other by employing laser welding, whereby the connected region can be easily made to generate heat due to the fifth metal layer. Due to these, the second metal layer and the cell negative electrodes can be easily connected with each other in a case of employing resistance welding or laser welding. Further, the fourth metal layer made of Cu can be inhibited from being corroded, due to the fifth metal layer made of Ni having corrosion resistance. In addition, the second metal layer consists of the clad portion having the third metal layer, the fourth metal layer and the fifth metal layer so that a three-layer structure consisting of the third metal layer, the fourth metal layer and the fifth metal layer can be formed through one bonding step, whereby the negative-electrode terminal for a cell can be easily manufactured.

Preferably in the aforementioned negative-electrode terminal for a cell in which the second metal layer consists of the clad portion having the third metal layer, the fourth metal layer and the fifth metal layer, the thickness of the fourth metal layer is larger than the thickness of the fifth metal layer. When structured in this manner, the thickness of the fourth metal layer made of Cu smaller in electrical resistance and lower in melting point than Ni constituting the third metal layer can be enlarged, whereby the electrical resistance of the second metal layer can be easily reduced, while the second metal layer and the cell negative electrodes can be connected with each other by welding or the like under a lower temperature condition.

Preferably in the aforementioned negative-electrode terminal for a cell in which the thickness of the fourth metal layer is larger than the thickness of the fifth metal layer, the thickness of the fourth metal layer is at least the total thickness of the thickness of the third metal layer and the thickness of the fifth metal layer. When structured in this manner, the thickness of the fourth metal layer made of Cu smaller in electrical resistance and lower in melting point than Ni constituting the third metal layer and the fifth metal layer, whereby the electrical resistance of the second metal layer can be effectively reduced, while the second metal layer and the cell negative electrodes can be connected with each other by welding or the like under a lower temperature condition.

Preferably in the negative-electrode terminal for a cell according to the aforementioned aspect, a groove portion is formed in the stacked region of the first metal layer, and the second metal layer is bonded to the first metal layer in a state embedded in the groove portion of the first metal layer. When structured in this manner, positioning of the second metal layer embedded in the groove portion can be easily performed due to the groove portion of the first metal layer.

Preferably in the negative-electrode terminal for a cell according to the aforementioned aspect, the surface of the first metal layer in the connected region and the surface of the second metal layer bonded to the first metal layer in the stacked region are connected with each other in the form of planar surfaces. When structured in this manner, foreign matter is inhibited from coming into contact with or being caught by a connected portion between the first metal layer and the second metal layer, dissimilarly to a case where an irregular shape is formed by the first metal layer and the second metal layer. Thus, the first metal layer and the second metal layer can be inhibited from separating from each other from the connected portion between the first metal layer and the second metal layer serving as a starting point.

Preferably in the negative-electrode terminal for a cell according to the aforementioned aspect, the thickness of the second metal layer is not more than the thickness of the first metal layer in the stacked region. When structured in this manner, the weight of the negative-electrode terminal for a cell can be inhibited from enlarging by setting the thickness of the second metal layer containing Ni and Cu larger in weight (specific gravity) per unit volume than Al or an Al alloy to not more than the thickness of the first metal layer made of Al or an Al alloy.

Preferably in this case, the thickness of the second metal layer is at least 10% and not more than 50% of the total thickness of the thickness of the first metal layer in the stacked region and the thickness of the second metal layer. When structured in this manner, the weight of the negative-electrode terminal for a cell can be more inhibited from enlarging.

Preferably in the negative-electrode terminal for a cell according to the aforementioned aspect, the clad portion constituting the negative-electrode terminal for a cell is configured, in a state insulated from lids of cell cases of the cells, to be arrangeable on the upper surfaces of the lids of the cell cases. When structured in this manner, the negative-electrode terminal for a cell and the lids of the cell cases can be inhibited from shorting by insulating the negative-electrode terminal for a cell and the lids of the cell cases from each other.

Preferably in the negative-electrode terminal for a cell according to the aforementioned aspect, at least part of the first metal layer in the connected region is provided in the form of a planar surface to be weldable to the cell terminal connecting plate in the form of a flat plate. When structured in this manner, the first metal layer in the form of a planar surface and the cell terminal connecting plate in the form of a flat plate can be easily welded to each other.

Preferably in the negative-electrode terminal for a cell according to the aforementioned aspect, a notch portion is formed in the stacked region of the first metal layer, and the second metal layer is bonded to the first metal layer in a state arranged in the notch portion of the stacked region. When structured in this manner, a mask for the first metal layer may simply be formed only on one side of the second metal layer in a case of forming the mask on the surface of the first metal layer and working only the surface of the second metal layer, for example, dissimilarly to a case where the negative-electrode terminal for a cell consists of a clad portion of such a shape (inlay (INLAYS) shape) that both end surfaces of the second metal layer are not exposed, whereby only the surface of the second metal layer can be worked.

Effect of the Invention

According to the present invention, as hereinabove described, separation between the first metal layer and the second metal layer can be rendered hard to take place by suppressing excess formation of an intermetallic compound on the bond interface between the first metal layer and the second metal layer.

MODES FOR CARRYING OUT THE INVENTION

Embodiments of the present invention are now described on the basis of the drawings.

First Embodiment

First, the structure of a lithium ion cell assembly 100 according to a first embodiment of the present invention is described with reference to FIGS. 1 to 7.

Figure 1:
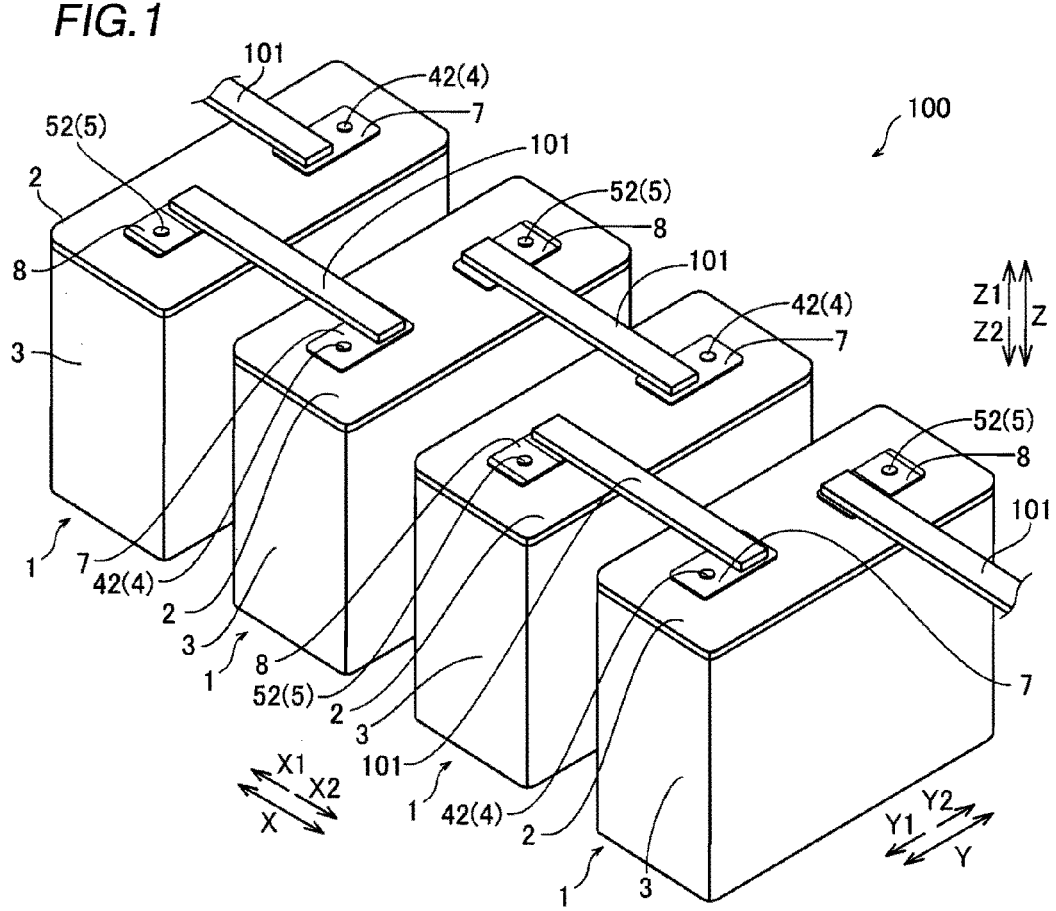
FIG. 1 A perspective view showing a lithium ion cell assembly according to a first embodiment of the present invention.

The lithium ion cell assembly 100 according to the first embodiment of the present invention is a large-sized cell system employed for an electric vehicle (EV, electric vehicle), a hybrid vehicle (HEV, hybrid electric vehicle), a residential power storage system or the like. This lithium ion cell assembly 100 is constituted of a plurality of lithium ion cells 1 electrically connected with each other by a plurality of bus bars 101 in the form of flat plates, as shown in FIG. 1. The lithium ion cells 1 are examples of the "cells" in the present invention, and the bus bars 101 are examples of the "cell terminal connecting plate" in the present invention.

In the lithium ion cell assembly 100, the plurality of lithium ion cells 1 are arranged to line up along the short-side direction (X direction) of the lithium ion cells 1 in plan view. In the lithium ion cell assembly 100, further, lithium ion cells 1 in which positive-electrode terminals 7 described later are positioned on one side (Y1 side) in a Y direction while negative-electrode terminals 8 described later are positioned on another side (Y2 side) in the Y direction and lithium ion cells 1 in which positive-electrode terminals 7 are positioned on the Y2 side and negative-electrode terminals 8 are positioned on the Y1 side are alternately arranged along the X direction.

The positive-electrode terminal 7 of a prescribed lithium ion cell 1 is welded (bonded) to one X-directional end of a bus bar 101, made of Al, extending in the X direction by resistance welding. The negative-electrode terminal 8 of the lithium ion cell 1 adjacent to the prescribed lithium ion cell 1 is welded to another X-directional end of a bus bar 101 made of Al by resistance welding. Thus, the positive-electrode terminals 7 of the lithium ion cells 1 are connected to the negative-electrode terminals 8 of the adjacent lithium ion cells 1 through the bus bars 101 made of Al. The lithium ion cell assembly 100 in which the plurality of lithium ion cells 1 are connected in series with each other is constituted in this manner.

Figure 2:
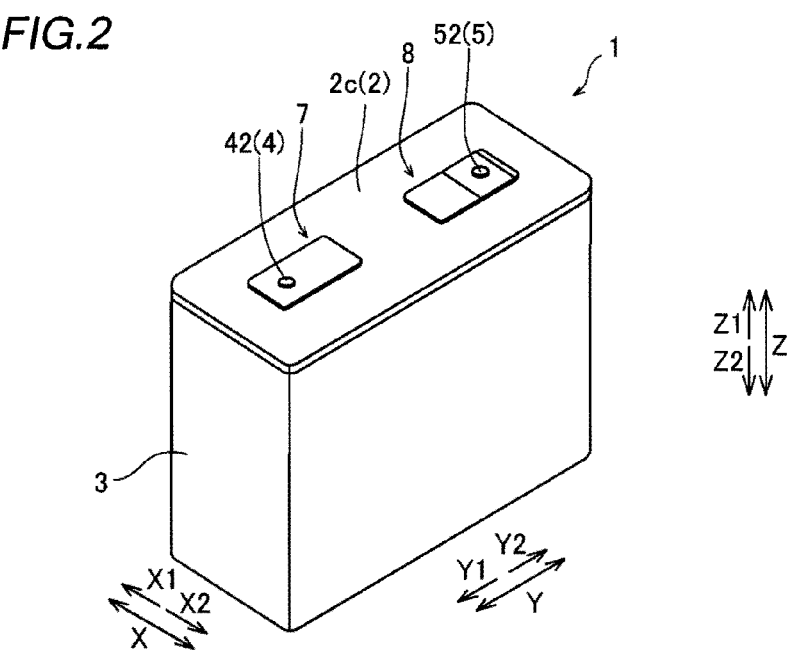
FIG. 2 A perspective view showing the overall structure of a lithium ion cell according to the first embodiment of the present invention.

Each lithium ion cell 1 has an outer shape substantially in the form of a rectangular parallelepiped, as shown in FIG. 2. Further, the lithium ion cell 1 includes a lid member 2 arranged above (on a Z1 side) and a cell case body 3 arranged below (on a Z2 side). This lid member 2 and the cell case body 3 both consist of Ni-plated steel plates. The lid member 2 is an example of the "lids of the cell cases" in the present invention.

Figure 3:
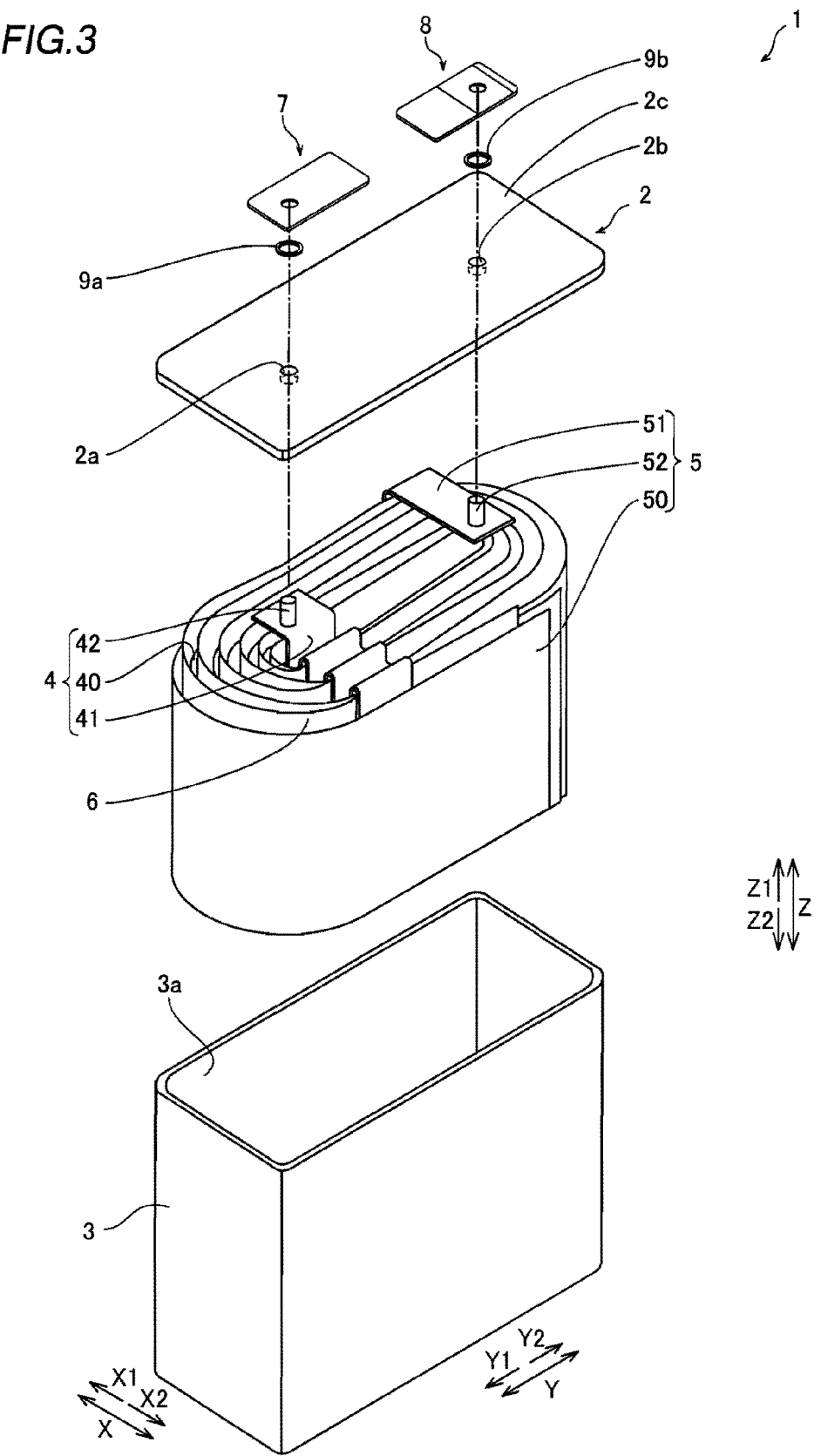
FIG. 3 An exploded perspective view showing the overall structure of the lithium ion cell according to the first embodiment of the present invention.

The lid member 2 is provided in the form of a flat plate, as shown in FIG. 3. A pair of hole portions 2a and 2b are provided on the lid member 2, to pass through the same in the thickness direction (Z direction). These pair of hole portions 2a are formed at a prescribed interval in the longitudinal direction (Y direction) of the lid member 2, and formed substantially at centers in the short-side direction of the lid member 2. The lid member 2 is so configured that a positive-electrode columnar portion 42 described later and a negative-electrode columnar portion 52 described later are inserted into the pair of hole portions 2a and 2b from below (Z2 side) respectively.

Further, the lithium ion cell 1 includes a positive-electrode portion 4 and a negative-electrode portion 5 as well as an unshown electrolyte. The positive-electrode portion 4 is constituted of a positive electrode 40 in contact with the electrolyte, a collector portion 41 electrically connected to the positive electrode 40, and the positive electrode columnar portion 42 formed on an upper portion of the collector portion 41 to protrude upward (toward the Z1 side). The positive electrode 40, the collector portion 41 and the positive-electrode columnar portion 42 of the positive-electrode portion 4 are all made of Al.

The negative-electrode portion 5 is constituted of a negative electrode 50 in contact with the electrolyte, a collector portion 51 electrically connected to the negative electrode 50, and the negative-electrode columnar portion 52 formed on an upper portion of the collector portion 51 to protrude upward (toward the Z1 side). The negative electrode 50, the collector portion 51 and the negative-electrode columnar portion 52 of the negative-electrode portion 5 are all made of Cu. An Ni-plated layer 52a (see FIG. 6) is formed on a portion of the negative-electrode columnar portion 52 exposed to the exterior. The negative-electrode portion 5 is an example of the "cell negative electrodes" in the present invention.

The positive electrode 40 and the negative electrode 50 are stacked in a rolled manner in a state insulated from each other by a separator 6. The lithium ion cell 1 is so configured that the cell case body 2 and the lid member 2 are welded to each other in a state where the positive-electrode portion 4 and the negative-electrode portion 5 insulated from each other by the separator 6 and the electrolyte are stored in a storage portion 3a of the cell case body 3. Thus, the lithium ion cell 1 is so configured that the storage portion 3a of the cell case body 3 is closed in a state where the electrolyte is inhibited from leaking out of the space between the lid member 2 and the cell case body 3.

Figure 4:
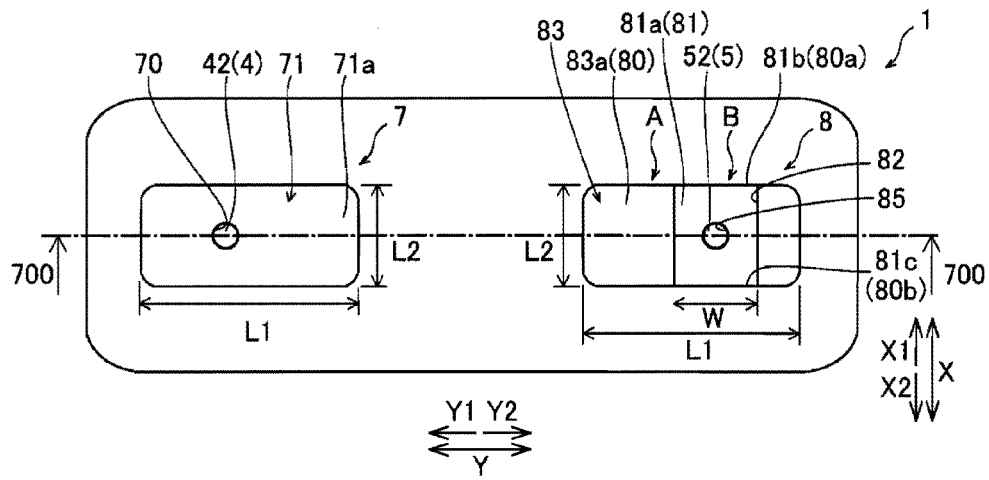
FIG. 4 A top plan view of the lithium ion cell according to the first embodiment of the present invention.
Figure 5:
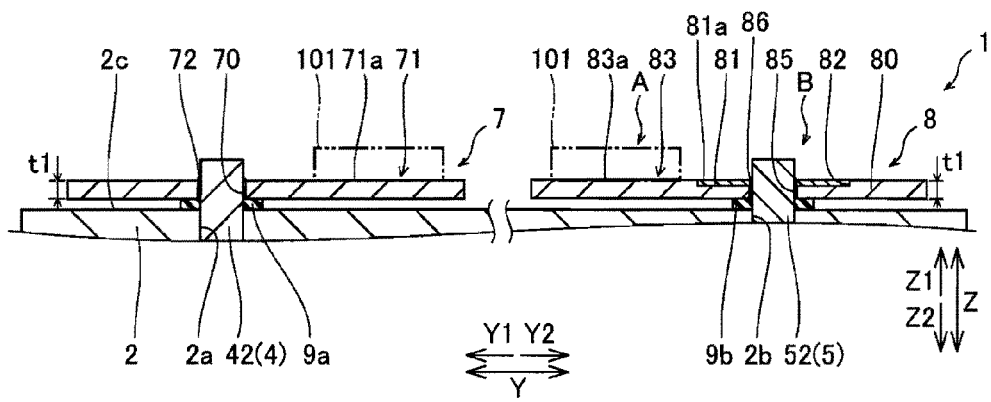
FIG. 5 A sectional view along the line 700-700 in FIG. 4.

As shown in FIG. 3, the positive-electrode terminal 7 is arranged on a Y1-side upper surface 2c (surface on the Z1 side) of the lid member 2, while the negative-electrode terminal 9 is arranged on a Y2-side upper surface 2c of the lid member 2. Each of the positive-electrode terminal 7 and the negative-electrode terminal 8 is provided substantially in the form of a flat plate, and subjected to chamfering (R chamfering) working on four corners. Further, each of the positive-electrode terminal 7 and the negative-electrode terminal 8 has a length L1 of about 40 mm in the longitudinal direction (Y direction), and has a length L2 of about 20 mm in the short-side direction (X direction), as shown in FIG. 4. In addition, the positive-electrode terminal 7 and the negative-electrode terminal 8 have a thickness t1 of about 1.8 mm in the Z direction, as shown in FIG. 5. The positive-electrode terminal 7 is an example of the "cell terminals" in the present invention, and the negative-electrode terminal 8 is an example of the "negative-electrode terminal for a cell" and the "cell terminals" in the present invention.

The positive-electrode terminal 7 is made of Al. Further, the positive-electrode terminal 7 has a hole portion 70 formed to pass through the same in the thickness direction (Z direction) on one side (Y1 side) in the longitudinal direction (Y direction) and a bus bar bonding portion 71 arranged on another side (Y2 side), as shown in FIGS. 4 and 5. The hole portion 70 is formed substantially at the center in the short-side direction (X direction), and so configured that the positive-electrode columnar portion 42 of the positive-electrode portion 4 is inserted thereinto from below (Z2 side, see FIG. 5).

As shown in FIG. 5, the inner side surface of an upper portion of the hole portion 70 and the positive-electrode columnar portion 42 are bonded to each other by laser welding in a state where the positive-electrode columnar portion 42 of the positive-electrode portion 4 is inserted into the hole portion 70 to be exposed upward (toward the Z1 side) beyond the upper surface of the positive-electrode terminal 7. Thus, a weld portion 72 mainly made of Al is formed on a bonded portion between the Z1-side inner side surface of the hole portion 70 and the positive-electrode columnar portion 42. The lithium ion cell 1 is so configured that the bus bar 101 in the form of a flat plate is welded to a planar-surface-shaped upper surface 71a of the bus bar bonding portion 71 by resistance welding.

Figure 6:
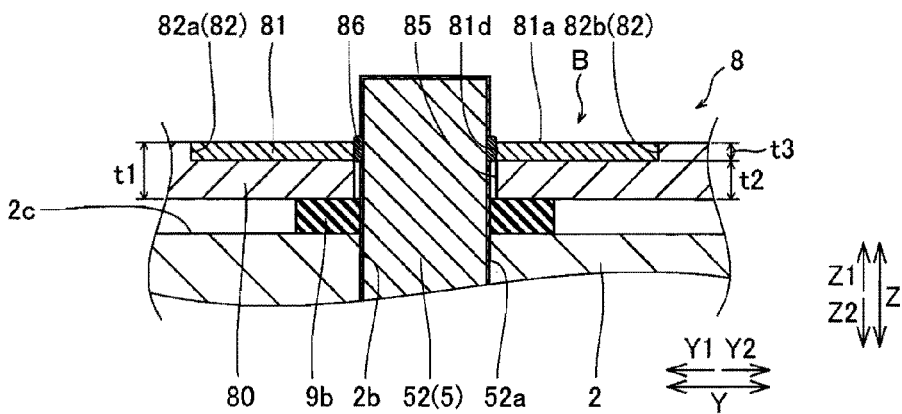
FIG. 6 An enlarged sectional view around a negative-electrode terminal along the line 700-700 in FIG. 4.
Figure 7:
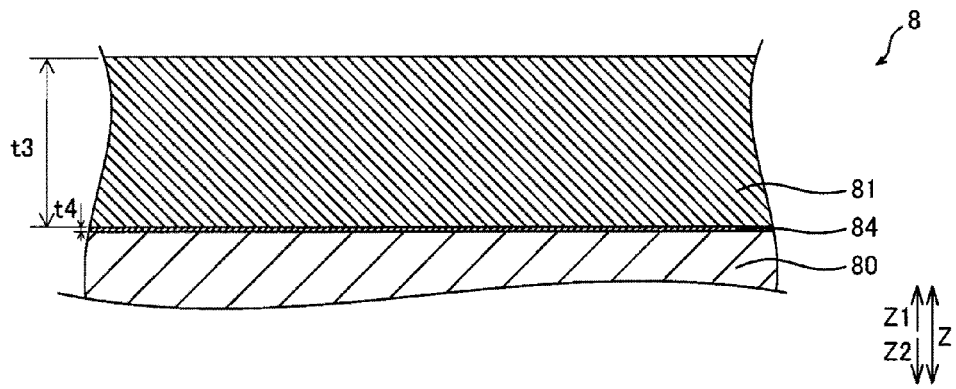
FIG. 7 An enlarged sectional view around a bond region along the line 700-700 in FIG. 4.

According to the first embodiment, the negative-electrode terminal 8 consists of a clad material (clad portion) in which an Al layer 80 made of Al and an Ni—Cu alloy layer 81 mainly constituted of Ni and Cu are bonded to each other, as shown in FIGS. 5 to 7. This Ni—Cu alloy layer 81 preferably contains Ni by at least about 2 mass % and not more than about 32 mass %, and more preferably contains Ni by at least about 10 mass % and not more than about 32 mass %. In the Ni—Cu alloy layer 81, the rest other than Ni is substantially made of Cu. The Al layer 80 and the Ni—Cu alloy layer 81 are examples of the "first metal layer" and the "second metal layer" in the present invention respectively.

The melting point of Cu is 1083° C., and the electrical resistance thereof is 0.017 μΩ·m. Further, the melting point of Ni is 1455° C., and the electrical resistance thereof is 0.069 μΩ·m. In other words, the melting point and the electrical resistance of Ni are higher than the melting point and the electrical resistance of Cu respectively. In addition, Ni has a property harder to corrode than Cu.

As the specific structure of the negative-electrode terminal 8, the Al layer 80 has a groove portion 82 and a bus bar bonding portion 83, as shown in FIG. 5. The groove portion 82 is so formed that an inner side surface 82a on one side (Y1 side) in the Y direction is positioned slightly closer to the Y1 side than a central portion of the Al layer 80 in the Y direction and an inner side surface 82b on the Y2 side is positioned closer to the Y1 side than an end portion of the Al layer 80 on the Y2 side. The bus bar bonding portion 83 corresponds to a region A from the inner surface 82a of the groove portion 82 up to an end portion on the Y1 side. In other words, the groove portion 82 is formed on a region B different from the bus bar bonding portion 33, to be adjacent to the bus bar bonding portion 83. The region A and the region B are examples of the "connected region" and the "stacked region" in the present invention respectively. The Y direction is an example of the "first direction" in the present invention.

As shown in FIG. 6, the Ni—Cu alloy layer 81 is stacked on the Al layer 80 in a state embedded in the groove portion 82 formed in the Al layer 80. The Al layer 80 and the Ni—Cu alloy layer 81 are bonded to each other in the state where the Ni—Cu alloy layer 81 is embedded in the groove portion 82. In other words, the negative-electrode terminal 8 consists of a clad material (clad portion) of such a shape (inlay (INLAYS) shape) that the Ni—Cu alloy layer 81 is not exposed on both end portions of the Al layer 80 in the Y direction. As shown in FIG. 5, an upper surface 81a of the Ni—Cu alloy layer 81 and an upper surface 83a of the bus bar bonding portion 83 are both exposed on an upper portion (on the Z1 side) opposite to the cell case 3 (cell 1), and connected to each other to be substantially in the form of planar surfaces having no steps in the boundary portion (connected portion).

As shown in FIG. 6, the thickness t2 of the Al layer 80 is at least about 0.9 mm and not more than about 1.62 mm while the thickness t3 of the Ni—Cu alloy layer 81 is at least about 0.18 mm and not more than about 0.9 mL in the region B. In other words, the thickness t3 of the Ni—Cu alloy layer 81 is at least about 10% and not more than about 50% of the thickness t1 (about 1.8 mm) of the negative-electrode terminal 8.

As shown in FIG. 7, a bond region 84 is formed on a bond interface between the Ni—Cu alloy layer 81 and the bottom surface (surface on the Z2 side) of the groove portion 82. This bond region 84 is formed when pressure-bonding and diffusion-annealing the Al layer 80 and the Ni—Cu alloy layer 81. The bond region 84 has a thickness t4 of at least about 1 μm and not more than about 5 μm.

As shown in FIG. 4, the groove portion 82 is formed to extend in the X direction orthogonal to the Y direction on the same surface from an X1-side end portion 80a up to an X2-side end portion 80b of the Al layer 80, and the Ni—Cu alloy layer 81 extends while being embedded in the groove portion 82 to extend in the X direction from an X1-side end portion 81b up to an X2-side end portion 81c. In other words, the groove portion 82 and the Ni—Cu alloy layer 81 both have the length L2 of about 20 mm in the X direction. Further, the groove portion 82 and the Ni—Cu alloy layer 81 both have a width W of about 15 mm in the Y direction. The X direction is an example of the "second direction" in the present invention.

The bus bar bonding portion 33 is arranged in the region A consisting of only the Al layer 80 on the Y1 side of the groove portion 82. The lithium ion cell 1 is so configured that the bus bar 101 in the form of a flat plate is welded to the planar-surface-shaped upper surface 83a of the bus bar bonding portion 83 by resistance welding, as shown in FIG. 5.

The negative-electrode terminal 8 has a hole portion 85 formed to pass through the same in the thickness direction (Z direction) on one side (Y2 side) in the longitudinal direction (Y direction). This hole portion 85 is formed in the region B, and formed substantially at the center in the short-side direction (X direction, see FIG. 4). The hole portion 85 is so configured that the negative-electrode columnar portion 52 of the negative-electrode portion 5 is inserted thereinto from below (Z2 side), as shown in FIG. 6.

The hole portion 85 is formed to pass through the Al layer 80 arranged on the Z2 side and the Ni—Cu alloy layer 81 arranged on the 21 side in the region B. In other words, the hole portion 85 is so configured that the Ni—Cu alloy layer 81 is positioned on the Z1 side in the inner side surface of the hole portion 85 and the Al layer 80 is positioned on the Z2 side. A Z1-side portion of the inner side surface of the hole portion 85 and the negative-electrode columnar portion 52 are welded to each other by laser welding in a state where the negative-electrode columnar portion 52 of the negative-electrode portion 5 is inserted into the hole portion 85 to be exposed upward (toward the Z1 side) beyond the upper surface 81a of the Ni—Cu alloy layer 812. More specifically, an inner side surface 81d of the hole portion 85 constituted of the Ni—Cu alloy layer 81 and the Ni-plated layer 52a of the negative-electrode columnar portion 52 are welded to each other. Thus, a weld portion 86 is formed on a welded portion between the inner side surface 81d of the Ni—Cu alloy layer 81 and the Ni-plated layer 52a of the negative-electrode columnar portion 52.

As shown in FIG. 5, ring-shaped packings 9a and 9b are arranged between the positive-electrode terminal 7 and the negative-electrode terminal 8 and the lid member 2 respectively. These packings 9a and 9b are made of a material having insulating properties, and arranged to inhibit the positive-electrode terminal 7 and the negative-electrode terminal 8 and the lid member 2 from coming into contact with each other. Thus, the lithium ion cell 1 is so configured that the positive-electrode terminal 7 and the negative-electrode terminal 8 and the upper surface 2c of the lid member 2 are insulated from each other. The positive-electrode columnar portion 42 and the negative-electrode columnar portion 52 are inserted into hole portions of the packings 9a and 9b respectively.

A manufacturing process for the lithium ion cell 1 according to the first embodiment of the present invention and a manufacturing process for the lithium ion cell assembly 100 are now described with reference to FIGS. 1 to 8.

First, an Al plate (not shown) made of Al having a thickness of about 4 mm is prepared. This Al plate has a width of about 60 mm in the short-side direction, and is wound in the form of a roll in the longitudinal direction. Then, the groove portion 82 (see FIG. 8) having the width of about 15 mm in the Y direction and a depth of at least about 0.45 mm and not more than about 2.2 mm in the thickness direction is formed on a prescribed position of the Al plate by cutting.

Further, an Ni—Cu alloy plate (not shown) containing Ni and Cu is prepared. This Ni—Cu alloy plate has a thickness of about 2 mm, has a width of about 15 mm in the short-side direction, and is wound in the form of a roll in the longitudinal direction. Then, the Ni—Cu alloy plate and the Al plate are pressure-bonded to each other by applying prescribed pressure in a state of inserting the Ni—Cu alloy plate into the groove portion 82 of the Al plate. At this time, the Ni—Cu alloy plate and the Al plate are pressure-bonded to each other while pressing the upper surface of the Al plate positioned on one side of the groove portion 82 in the short-side direction and the upper surface of the Al plate positioned on another side in the short-side direction.

Figure 8:
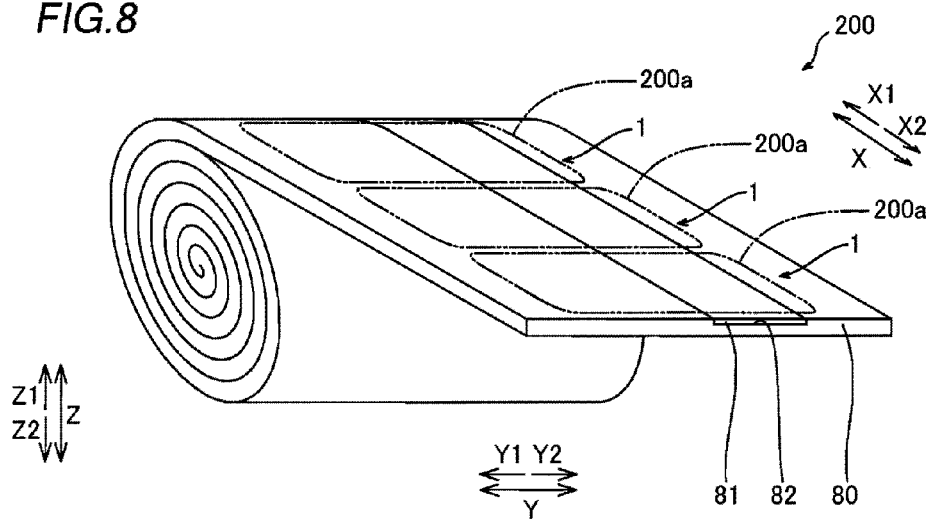
FIG. 8 A perspective view for illustrating a manufacturing process for the negative-electrode terminal according to the first embodiment of the present invention.

Thereafter a bond material of the Ni—Cu alloy plate and the Al plate is retained under a temperature condition of at least about 450° C. and not more than about 650° C. in a hydrogen atmosphere for at least about 10 seconds and not more than about 3 minutes. Thereafter diffusion annealing is performed by gradually cooling the bond material of the Ni—Cu alloy plate and the Al plate. Then, the bond material of the Ni—Cu alloy plate and the Al plate is so rolled that the bond region 84 (see FIG. 7) is formed on the bond interface between the Ni—Cu alloy layer 81 and the bottom surface of the groove portion 82. As a result of this, a clad material 200 in which the Al layer 80 made of Al and the striped Ni—Cu alloy layer 81 are pressure-bonded to each other is prepared in a state where the Ni—Cu alloy layer 81 is embedded in the groove portion 82, as shown in FIG. 8. This clad material 200 has the thickness t1 (see FIG. 6) of about 1.8 ml, and is wound in the form of a roll in the longitudinal direction (X direction).

In the clad material 200, the thickness t2 (see FIG. 6) becomes at least about 0.9 mm and not more than about 1.62 mm and the thickness t3 (see FIG. 6) of the Ni—Cu alloy layer 81 becomes at least about 0.18 mm and not more than about 0.9 mm in the region B of the Al layer 80 corresponding to the groove portion 82 to which the Ni—Cu alloy layer 81 is bonded.

Thereafter each negative-electrode terminal 8 is punched out of the clad material 200 by pressing. At this time, the negative-electrode terminal 8 is punched out along a punching line 200a to have the length L1 (see FIG. 4) of about 40 mm in the Y direction and to have the length L2 (see FIG. 4) of about 20 mm in the X direction. At the same time, the hole portion 85 (see FIG. 5) is formed to pass through the Al layer 80 and the Ni—Cu alloy layer 81 in the region B. Thus, the negative-electrode terminal 8 having the Ni—Cu alloy layer 81 formed to extend from the X1-side end portion 81b up to the X2-side end portion 81c in the X direction and the hole portion 85 formed in the region B as shown in FIG. 4 is plurally manufactured from the roll-shaped clad material 200.

Then, the negative-electrode terminal 8 and the negative-electrode columnar portion 52 of the negative-electrode portion 5 are welded to each other. More specifically, the negative-electrode columnar portion 52 exposed from the hole portion 2b of the lid member 2 is passed through the hole portion of the packing 9b, and thereafter inserted into the hole portion 85 of the negative-electrode terminal 8 to be exposed upward (toward the Z1 side) beyond the upper surface 81a of the Ni—Cu alloy layer 81 of the negative-electrode terminal 8, as shown in FIG. 6. Then, the Z1-side inner side surface 81d of the hole portion 85 constituted of the Ni—Cu alloy layer 81 and the negative-electrode columnar portion 52 are welded to each other by laser welding. At this time, the Ni—Cu alloy layer 81 easily generates heat by absorbing a laser beam, since the same contains Ni. Thus, the Ni—Cu alloy layer 81 and the Ni-plated layer 52a of the negative-electrode columnar portion 52 are melted, and the weld portion 86 is formed on the welded portion between the Ni—Cu alloy layer 81 and the Ni-plated layer 52a of the negative-electrode columnar portion 52. As a result of this, the negative-electrode terminal 8 and the negative-electrode portion 5 are connected with each other.

Further, the positive-electrode terminal 7 made of Al having the hole portion 70 is prepared, as shown in FIG. 5. Then, the positive-electrode terminal 7 made of Al and the positive-electrode columnar portion 42 of the positive-electrode portion 4 are welded to each other, similarly to the negative-electrode terminal 8 and the negative-electrode columnar portion 52 of the negative-electrode portion 5. Thus, the weld portion 72 mainly made of Al is formed on the welded portion between the Z1-side inner side surface of the hole portion 70 and the positive-electrode columnar portion 42, and the positive-electrode terminal 7 and the positive-electrode portion 4 are connected with each other. Thereafter the cell case body 3 and the lid member 2 are welded to each other in the state of storing the positive-electrode portion 4 and the negative-electrode portion 5 and the electrolyte insulated from each other by the separator 6 in the storage portion 3a of the cell case body 3, as shown in FIG. 3. Thus, the lithium ion cell 1 shown in FIG. 2 is manufactured.

Thereafter the plurality of lithium ion cells 1 are arranged along the X direction, as shown in FIG. 1. Then, the positive-electrode terminal 7 in the bus bar bonding portion 71 of the prescribed lithium ion cell 1 and one end of the bus bar 101 in the X direction are resistance-welded to each other. Then, the Al layer 80 of the negative-electrode terminal 8 in the bus bar bonding portion 83 of the lithium ion cell 1 adjacent to the prescribed lithium ion cell 1 and another end of the bus bar 101 in the X direction are resistance-welded to each other. At this time, the upper surface 71a of the bus bar bonding portion 71 in the form of a planar surface and the bus bar 101 in the form of a flat plate are welded to each other while the upper surface 83a of the bus bar bonding portion 83 in the form of a planar surface and the bus bar 101 in the form of a flat plate are welded to each other, as shown in FIG. 5. Thus, the bus bar bonding portion 71 of the positive-electrode terminal 7 and the bus bar 101 are welded to each other through a bonded portion (not shown) made of Al. Further, the bus bar bonding portion 83 of the negative-electrode terminal 8 and the bus bar 101 are welded to each other through a bonded portion (not shown) made of Al.

At this time, the negative-electrode terminal 8 and the bus bar 101 are resistance-welded to each other in the region A different from the region B where the Al layer 80 and the Ni—Cu alloy layer 81 are bonded to each other, whereby heat resulting from the resistance welding hardly reaches the bond region 84 (see FIG. 7) between the Al layer 80 and the Ni—Cu alloy layer 81. Thus, an intermetallic compound constituted of Al and Ni is inhibited from being excessively formed with a thickness larger than about 10 μm in the bond region 84.

As a result of this, the lithium ion cell assembly 100 shown in FIG. 1, in which the plurality of lithium ion cells 1 are serially connected with each other by the plurality of bus bars 101 made of Al, is manufactured.

According to the first embodiment, as hereinabove described, the Ni—Cu alloy layer 81 mainly constituted of Ni and Cu is bonded to the Al layer 80 in the region B to which the bus bar 101 made of Al is not welded so that the Ni—Cu alloy layer 81 is not arranged in the region A connected with the bus bar 101, whereby heat at the time when the negative-electrode terminal 8 and the bus bar 101 are connected with each other can be inhibited from reaching the bond region 84 between the Al layer 80 and the Ni—Cu alloy layer 81. Thus, the intermetallic compound containing Al and Ni can be inhibited from being excessively formed on the bond region 84 between the Al layer 80 and the Ni—Cu alloy layer 81 due to the heat at the time when the negative-electrode terminal 8 and the bus bar 101 are resistance-welded to each other, whereby separation between the Al layer 80 and the Ni—Cu alloy layer 81 can be rendered hard to take place.

According to the first embodiment, the Ni—Cu alloy layer 81 connected with the negative-electrode columnar portion 52 is mainly constituted of Ni and Cu so that a bond structure of Al and Ni larger in bond strength than a bond structure of only Al and Cu can be formed on the bond region 84 between the Al layer 80 and the Ni—Cu alloy layer 81 due to Ni in the Ni—Cu alloy layer 81 when forming the clad material by bonding the Al layer 80 and the Ni—Cu alloy layer 81 to each other, whereby the Al layer 80 and the Ni—Cu alloy layer 81 can be strongly bonded to each other. Further, the electrical resistance of the Ni—Cu alloy layer 81 can be reduced due to Cu in the Ni—Cu alloy layer 81 as compared with a case where the Ni—Cu alloy layer 81 is constituted of only Ni larger in electrical resistance and higher in melting point than Cu, while the Ni—Cu alloy layer 81 and the negative-electrode columnar portion 52 can be connected with each other by laser welding under a lower temperature condition.

According to the first embodiment, the Ni—Cu alloy layer 81 is so employed that the structure of the negative-electrode terminal 8 can be simplified dissimilarly to a case where the Ni—Cu alloy layer 81 includes a clad material containing Ni and Cu and consisting of a plurality of layers.

According to the first embodiment, the planar-surface-shaped upper surface 83a of the bus bar bonding portion 83 made of Al is so configured that the flat-plate-shaped bus bar 101 made of Al is welded thereto by resistance welding, whereby the positive-electrode terminals 7 and the negative-electrode terminals 8 of the plurality of lithium ions cells 1 can be electrically connected with each other by employing the bus bars 101 made of Al. At this time, Al is smaller in weight than Cu or Ni which is a general material for the bus bars 101, whereby the weight of the lithium ion cell assembly 100 can be reduced. Further, the lithium ion cell assembly 100 consists of the Al layers 80 in the form of planar surfaces and the bus bars 101 in the form of flat plates, whereby the Al layers 80 and the bus bars 101 can be easily welded to each other.

According to the first embodiment, the inner side surface 81d of the hole portion 85 constituted of the Ni—Cu alloy layer 81 containing Ni and the Ni-plated layer 52a of the negative-electrode columnar portion 52 are welded to each other, whereby a fragile intermetallic compound containing Al and Cu can be inhibited from being formed on the connected region, dissimilarly to a case of connecting the Al layer 80 to the negative-electrode columnar portion 52. Thus, the negative-electrode terminal 8 and the negative-electrode portion 5 can be strongly connected to each other.

Cu constituting a general bus bar is a material unsuitable to welding, due to such a point that a fragile oxide is formed by oxidation, such a point that electrical resistance is small and such a point that the same easily reflects light. Generally in a case of welding Cu, therefore, the same must be plated with Ni. Further, Cu is lower in corrosion resistance than Al, and hence the same must be plated with Ni also from the point of improvement in corrosion resistance. According to the first embodiment, on the other hand, the Al layer 80, made of Al, of the negative-electrode terminal 8 in the bus bar bonding portion 83 and the bus bar 101 made of Al are resistance-welded to each other in the bus bar bonding portion 83 as hereinabove described so that the bus bar 101 may not be plated with Ni as compared with a case of employing a bus bar made of Cu, whereby the negative-electrode portion 5 and the negative-electrode terminal 8 can be easily connected with each other.

According to the first embodiment, the Al layer 80, made of Al, of the negative-electrode terminal 8 and the bus bar 101 made of Al are resistance-welded to each other in the bus bar bonding portion 83, whereby an energized welded portion can be further made to generate heat than a case of employing a bus bar made of Cu, since Al has higher electrical resistance as compared with Cu. Thus, the welded portion between the bus bar bonding portion 83 and the bus bar 101 can be easily melted, whereby the negative-electrode terminal 8 and the bus bar 101 can be more easily connected with each other. Further, Al is smaller in specific gravity as compared with Cu and Ni, whereby the lithium ion cell assembly 100 can be more reduced in weight than a case of employing a bus bar made of Cu or Ni, by employing Al for the bus bar 101.

According to the first embodiment, the upper surface 81a of the Ni—Cu alloy layer 81 and the upper surface 83a of the bus bar bonding portion 83 are both arranged on the upper side (Z1 side) opposite to the cell case 3 (cell 1), whereby the bus bar 101 can be easily connected to the Al layer 80 (bus bar bonding portion 83) from above, while the negative-electrode columnar portion 52 of the negative-electrode portion 5 can be easily connected to the Ni—Cu alloy layer 81.

According to the first embodiment, the groove portion 82 is formed in the region B of the Al layer 80 while the Ni—Cu alloy layer 81 is bonded to the Al layer 80 in the state embedded in the groove portion 82 of the Al layer 80, whereby positioning of the Ni—Cu alloy layer 81 embedded in the groove portion 82 can be easily performed.

According to the first embodiment, the Ni—Cu alloy layer 81 is extended while being embedded in the groove portion 82 to extend in the X1 direction from the X1-side end portion 81b up to the X2-side end portion 81c, whereby the plurality of negative-electrode terminals 8 can be easily obtained from one clad material 200 by punching out the clad material 200 stacked on the Al layer 80 so that the Ni—Cu alloy layer 81 extends in the X direction at prescribed intervals in the X direction.

According to the first embodiment, Al and Ni can be reliably bonded to each other on the bond region 84 between the Al layer 80 and the Ni—Cu alloy layer 81 when configuring the Ni—Cu alloy layer 81 to contain Ni by at least about 2 mass % and not more than about 32 mass %, whereby the Al layer 80 and the Ni—Cu alloy layer 81 can be more strongly bonded to each other.

According to the first embodiment, Al and Ni can be more reliably bonded to each other on the bond region 84 between the Al layer 80 and the Ni—Cu alloy layer 81 when configuring the Ni—Cu alloy layer 81 to contain Ni by at least about 10 mass % and not more than about 32 mass %, whereby the Al layer 80 and the Ni—Cu alloy layer 81 can be further strongly bonded to each other.

According to the first embodiment, the negative-electrode terminal 8 is configured to consist of the clad material of such a shape (inlay shape) that the Ni—Cu alloy layer 81 is not exposed on both end portions of the Al layer 80 in the Y direction, whereby not only the upper surface of the Al plate positioned on one side but also the upper surface of the Al plate positioned on another side can be pressed when forming the clad material 200, as compared with a case where the negative-electrode terminal consists of a clad material of such a shape (edgelay (EDGELAYS) shape) that an end surface of a terminal connecting layer is exposed. Thus, the clad material 200 in which the Al layer 80 and the Ni—Cu alloy layer 81 are pressure-bonded to each other can be easily formed.

According to the first embodiment, the upper surface 81a of the Ni—Cu alloy layer 81 and the upper surface 83a of the bus bar bonding portion 83 are connected with each other to be substantially in the form of planar surfaces having no steps in the boundary portion (connected portion), whereby foreign matter can be inhibited from coming into contact with or being caught by the connected portion (inner side surface 82a of the groove portion 82) between the Al layer 80 and the Ni—Cu alloy layer 81, dissimilarly to a case where an irregular shape is formed by the bus bar bonding portion 83 (Al layer 80) and the Ni—Cu alloy layer 81. Thus, the Al layer 80 and the Ni—Cu alloy layer 81 can be inhibited from separating from each other from the connected portion between the Al layer 80 and the Ni—Cu alloy layer 81 serving as a starting point.

According to the first embodiment, the thickness t3 of the Ni—Cu alloy layer 81 is set to at least about 10% and not more than about 50% of the thickness t1 of the negative-electrode terminal 8, whereby the weight of the negative-electrode terminal 8 can be inhibited from enlarging by setting the thickness t3 of the Ni—Cu alloy layer 81 containing Ni and Cu larger in weight (specific gravity) per unit volume than Al to not more than the thickness t2 of the Al layer 80 made of Al.

According to the first embodiment, the positive-electrode terminal 7 and the negative-electrode terminal 8 and the upper surface 2c of the lid member 2 are insulated from each other by employing the packings 9a and 9b, whereby the negative-electrode terminal 8 and the lid member 2 can be inhibited from shorting.

EXAMPLES

A confirmation experiment for the bond strength of the negative-electrode terminal 8 conducted in order to confirm effects of the aforementioned first embodiment is now described. More specifically, the confirmation experiment for the bond strength was conducted by preparing the following test materials 300 according to Examples 1 to 4 and comparative examples 1 and 2 as Examples corresponding to the aforementioned first embodiment and comparative examples corresponding to Examples.

Figure 9:
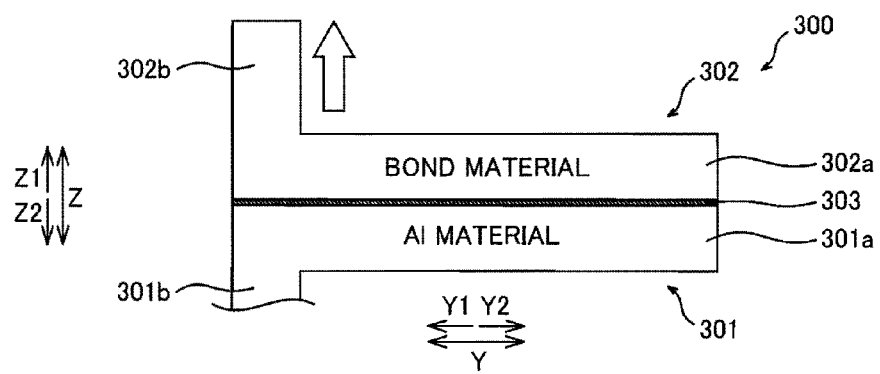
FIG. 9 A schematic view for illustrating a confirmation test for bond strength according to the present invention.

First, a test material 300 shown in FIG. 9 was prepared. More specifically, an Al material 301 made of Al having a thickness of 2.5 mm and a bond material 302 having a thickness of 2.0 mm were prepared. In Examples 1 to 4, Ni—Cu alloys containing Ni by 2 mass %, 10 mass %, 23 mass % and 45 mass % were employed as bond materials 302 respectively. In the Ni—Cu alloy containing Ni by 2 mass %, the solidus temperature is 1088° C., and the electrical resistance is 0.05 μΩ·m. In the Ni—Cu alloy containing Ni by 10 mass %, the solidus temperature is 1125° C., and the electrical resistance is 0.15 μΩ·m. In the Ni—Cu alloy containing Ni by 23 mass %, the solidus temperature is 1175° C., and the electrical resistance is 0.30 μΩ·m. In the Ni—Cu alloy containing Ni by 45 mass %, the solidus temperature is 1256° C., and the electrical resistance is 0.49 μΩ·m.

Figure 10:
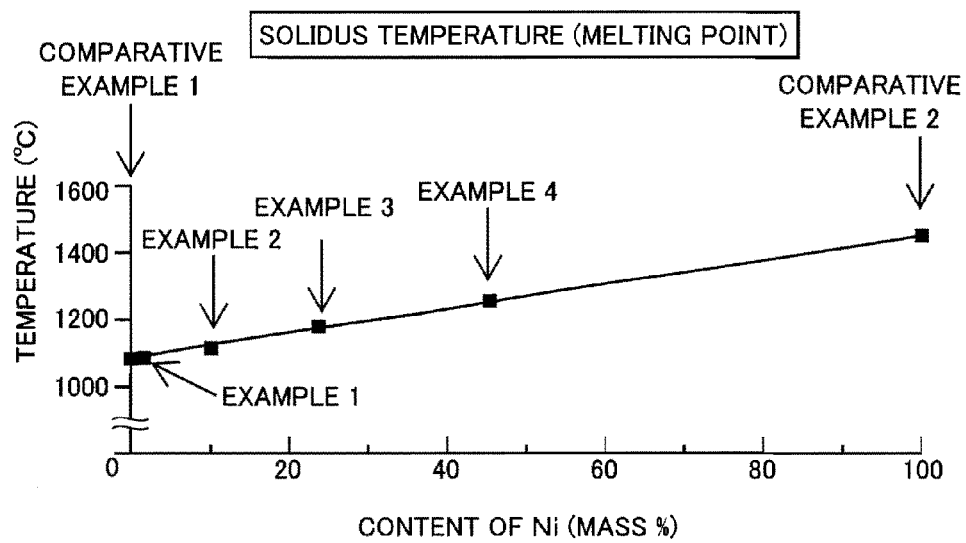
FIG. 10 A graph showing melting points of Cu and Ni and a change of a solidus temperature of an Ni—Cu alloy with respect to the content of Ni.

In comparative examples 1 and 2, on the other hand, a Cu material containing no Ni and an Ni material containing no Cu were employed as bond materials 302 respectively. As shown in the aforementioned first embodiment, the melting point of the Cu material is 1083° C., and the electrical resistance thereof is 0.017 μΩ·m. The melting point of the Ni material is 1455° C., and the electrical resistance thereof is 0.069 μΩ·m. As in a graph shown in FIG. 10, the solidus temperatures (melting points) of the bond materials 302 ascend as the contents of Ni enlarge.

Generally in an alloy, there are a solidus temperature which is the temperature at a time when part of an alloy consisting of only a solid phase is melted into a state where the solid state and a liquid state coexist and a liquidus temperature which is the temperature at a time when all of the alloy in the state where the solid phase and the liquid phase coexist is melted into only the liquid phase. When welding the alloy, it is possible to weld the same when part of the alloy is melted even if part of the alloy remains as a solid phase, and hence it is possible to regard the solidus temperature of an Ni—Cu alloy as a temperature at which the Ni—Cu alloy is melted.

Al materials 301 and bond materials 302 of the test materials 300 corresponding to Examples 1 to 4 and comparative examples 1 and 2 were all so formed that longitudinal sectional shapes become L shapes, as shown in FIG. 9. In other words, the Al materials 301 and the bond materials 303 were formed to have long side portions 301a and 302a extending in the horizontal direction (X direction and short side portions 301b and 302b extending in the vertical direction (Z direction) on X1-side end portions of the long side portions 301a and 302a respectively. Then, the Al materials 301 and the bond materials 302 were pressure-bonded to each other in a state of opposing the long side portions 301a of the Al materials 301 and the long side portions 302a of the bond materials 302 to each other. Thereafter the Al materials 301 and the bond materials 302 were retained under a temperature condition of 525° C. and in a hydrogen atmosphere for 3 minutes. Then, bond regions 303 were formed on bond interfaces between the Al materials 301 and the bond materials 302 by gradually cooling bond materials of Ni—Cu alloy plates and Al plates and performing diffusion annealing. Thus, the test materials 300 consisting of clad materials in which the Al materials 301 and the bond materials 302 were pressure-bonded to each other were prepared.

The prepared test materials 300 according to Examples 1 to 4 and comparative examples 1 and 2 were arranged so that the Al materials 301 were on lower sides (Z2 sides). Then, the Al materials 301 were fixed by unshown fixtures. Thereafter such force that the Al materials 301 and the bond materials 302 rupture (are ripped) along the bond regions 303 was applied to the test materials 300 by fixing the short side portions 302b of the bond materials 302 to unshown grasp portions and thereafter slidingly moving the grasp portions upward (toward the Z1 side) at a constant speed. At this time, the maximum values of tensile strength at the time of sliding the grasp portions upward were regarded as bond strength values at maximum points.

As results of the confirmation experiment for the bond strength, the test material 300 ruptured in the bond region 303 in Example 1 whose bond material 302 consisted of the Ni—Cu alloy containing Ni by 2 mass %. The bond strength at the maximum point in this Example 1 was 48.4 N/mm. In Example 2 whose bond material 302 consisted of the Ni—Cu alloy containing Ni by 10 mass %, the test material 300 ruptured in the Al material 301. The bond strength at the maximum point in this Example 2 was 60.0 N/mm. In Example 3 whose bond material 302 consisted of the Ni—Cu alloy containing Ni by 23 mass %, the test material 300 ruptured in the Al material 301. The bond strength at the maximum point in this Example 3 was 55.9 N/mm. In Example 4 whose bond material 302 consisted of the Ni—Cu alloy containing Ni by 45 mass %, the test material 300 ruptured in the Al material 301. The bond strength at the maximum point in this Example 4 was 72.8 N/mm.

In comparative example 1 whose bond material 302 consisted of the Cu material containing no Ni, on the other hand, the test material 300 ruptured in the bond region 303. The bond strength at the maximum point in this comparative example 1 was 15.7 N/mm. In comparative example 2 whose bond material 302 consisted of the Ni material containing no Cu, the test material 300 ruptured in the Al material 301. The bond strength at the maximum point in this comparative example 2 was 76.2 N/mm.

Figure 11:
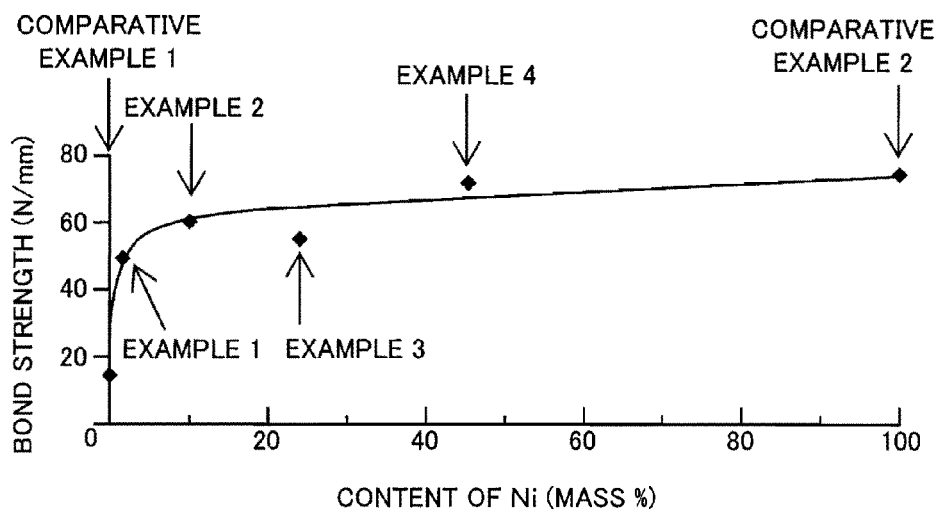
FIG. 11 A graph showing changes of bond strength at maximum points with respect to contents of Ni in Ni—Cu alloys in Examples of the present invention and comparative examples.

FIG. 11 shows a graph of the contents (mass %) of Ni in the bond materials 302 in the test materials 300 according to Examples 1 to 4 and comparative examples 1 and 2 and bond strength values at the maximum points. As shown in FIG. 11, it has been proved that the bond strength values of the Al materials 301 and the bond materials 302 at the maximum points enlarge in Examples 1 to 4 in which the bond materials 302 were made to contain not only Cu but also Ni, as compared with comparative example 1 whose bond material 302 consists of only Cu. This is conceivably because bond structures of Al and Ni having large bond strength values were formed on the bond regions 303.

In Examples 2 to 4 and comparative example 2 whose bond materials 302 contain Ni by at least 10 mass %, the test materials 300 ruptured not in the bond regions 303 but in the Al materials 301, while changes in amounts of increase of the bond strength at the maximum points with respect to increase of Ni quantities were reduced. In other words, the bond strength values at the maximum points did not much increase, regardless of increase in the Ni quantities. These are conceivably because the Al materials 301 themselves ruptured since bond structures of Al and Ni exhibiting large bond strength values were sufficiently formed in the bond regions 303 and the bond strength values of the bond regions 303 enlarged beyond the tensile strength values of the Al materials 301 themselves.

In Example 1 whose bond material 302 contains Ni by 2 mass %, on the other hand, the test material 300 ruptured (separated) in the bond region 303, while the bond strength lowered beyond those of Examples 2 to 4 whose bond materials 302 contain Ni by at least 10 mass %. These are conceivably because a bond structure of Al and Ni exhibiting large bond strength was not sufficiently formed on the bond region 303. The bond strength (48.4 N/mm) of Example 1 at the maximum point is at least three times the bond strength (15.7 N/m) at the maximum point in comparative example 1 whose bond material 302 contains no Ni, and it is conceivable that the bond strength of Example 1 is sufficiently large as compared with comparative example 1.

In an Ni—Cu alloy, the solidus temperature ascends and electrical resistance enlarges as the content of Ni enlarges. If the content of Ni excessively enlarges, therefore, the Ni—Cu alloy becomes hard to weld, and the electrical resistance thereof unpreferably enlarges. It is conceivably preferable that the solidus temperature is not more than 1200° C. and the electrical resistance is not more than 0.40 μΩ·m, and hence it is conceivably preferable that the Ni—Cu alloy contains Ni by not more than 32 mass %.

From these results, it has been proved that the Al material 301 and the bond material 302 can be more strongly bonded to each other by bonding the Al material 301 and the bond material 302 consisting of the Ni—Cu alloy to each other, as compared with a case of bonding the Al material 301 and the bond material 302 made of Cu to each other. Further, the Al material 301 and the bond material 302 consisting of the Ni—Cu alloy are so bonded to each other that the Al material 301 and the bond material 302 become easily weldable and the electrical resistance is reduced as compared with a case of bonding the Al material 301 and the bond material 302 made of Cu to each other. In addition, the Ni—Cu alloy of the bond material 302 preferably contains Ni by at least 2 mass % and not more than 32 mass %, and it is conceivable that the Ni—Cu alloy of the bond material 302 more preferably contains Ni by at least 10 mass % and not more than 32 mass % in particular. From the point that Ni is a rare metal, the content of Ni in the Ni—Cu alloy of the bond material 302 is preferably small so far as the Al material 301 and the bond material 302 are sufficiently bonded to each other.

Second Embodiment

The structure of a negative-electrode terminal 408 according to a second embodiment of the present invention is now described with reference to FIGS. 5, 12 and 13. In this negative-electrode terminal 408 according to the second embodiment, such a case that a terminal connecting layer 481 includes a clad material (clad portion) of a two-layer structure in which an Ni layer 487 and a Cu layer 488 are bonded to each other dissimilarly to the aforementioned first embodiment is described. The negative-electrode terminal 408 is an example of the "negative-electrode terminal for a cell" in the present invention.

Figure 12:
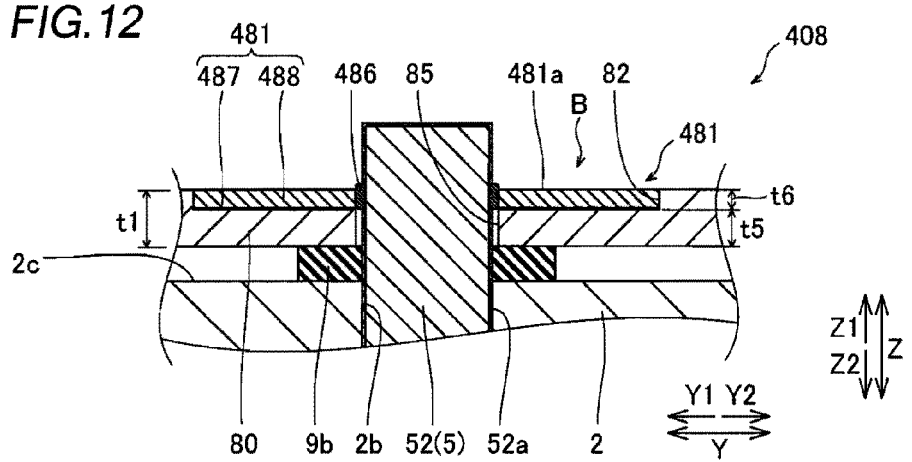
FIG. 12 An enlarged sectional view around a negative-electrode terminal according to a second embodiment of the present invention.

The negative-electrode terminal 408 according to the second embodiment of the present invention consists of a clad material in which an Al layer 80 made of Al and the terminal connecting layer 481 including the clad material of the two-layer structure are pressure-bonded to each other, as shown in FIG. 12. The terminal connecting layer 481 is embedded in a groove portion 82 of the Al layer 80 formed in a region B different from a bus bar bonding portion 83 (see FIG. 5). In the region B, the thickness t5 of the Al layer 80 is at least about 0.9 mm and not more than about 1.4 mm, while the thickness t6 of the terminal connecting layer 481 is at least about 0.4 mm and not more than about 0.9 mm. The terminal connecting layer 481 is an example of the "second metal layer" in the present invention.

According to the second embodiment, the terminal connecting layer 481 consists of a clad material of a two-layer structure in which an Ni layer 487 made of Ni and a Cu layer 488 made of Cu are pressure-bonded to each other and an Ni-plated layer 489. In a state where the terminal connecting layer 481 is arranged in the groove portion 82 of the Al layer 80, the Ni layer 487 of the terminal connecting layer 481 is arranged on a bottom surface side (Z2 side) of the groove portion 82 of the Al layer 80, while the Ni-plated layer 489 is formed on a side (Z1 side) of the Cu layer 488 opposite to the Ni layer 487. Further, the Ni-plated layer 489 is formed to be exposed on an upper surface 481a (surface on the Z1 side) of the terminal connecting layer 481. The Ni layer 487 is an example of the "third metal layer" in the present invention, and the Cu layer 488 is an example of the "fourth metal layer" in the present invention.

Figure 13:
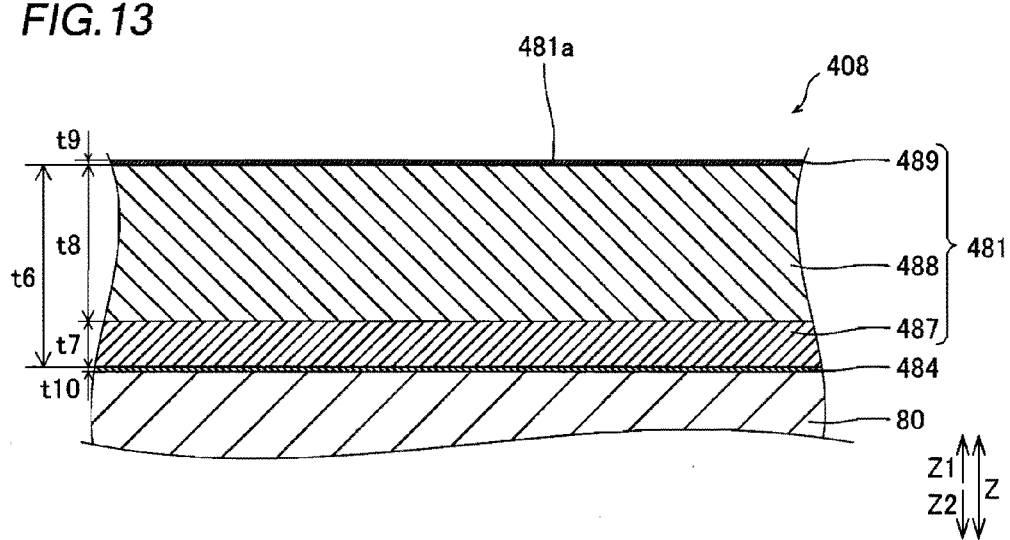
FIG. 13 An enlarged sectional view around a bond region according to the second embodiment of the present invention.

As shown in FIG. 13, the thickness t7 of the Ni layer 487 is at least about 0.01 mm and not more than about 0.1 mm, and the thickness t8 of the Cu layer 488 is at least about 0.3 mm and not more than about 0.89 mm. In other words, the thickness t8 of the Cu layer 488 is larger than the thickness t7 of the Ni layer 487. The thickness t7 of the Ni layer 487 is at least about 1% and not more than about 33% of the thickness t8 of the Cu layer 488, and at least about 0.6% and not more than about 5.6% of the thickness t1 (=t5+t6=about 1.8 mm, see FIG. 12) of the negative-electrode terminal 408. The thickness t9 of the Ni-plated layer is at least about 1.5 μm and not more than about 3 μm.

A bond region 484 in which Al in the Al layer 80 and Ni in the Ni layer 487 are diffusion-bonded to each other is formed on a bond interface between the Ni layer 487 of the terminal connecting layer 481 and the bottom surface (surface on the Z2 side) of the groove portion 487. This bond region 484 is formed when pressure-bonding and diffusion-annealing the Al layer 80 and the terminal connecting layer 481. The thickness t10 of the bond region 484 is at least about 1 μm and not more than about 5 μm.

As shown in FIG. 12, a weld portion 486 is formed on a welded portion between the terminal connecting layer 481 and an Ni-plated layer 52a of a negative-electrode columnar portion 52. The remaining structure of the negative-electrode terminal 408 according to the second embodiment is substantially similar to that in the aforementioned first embodiment.

A manufacturing process for a lithium ion cell employing the negative-electrode terminal 408 according to the second embodiment of the present invention is now described with reference to FIGS. 12 and 13.

First, a first clad material consisting of a two-layer structure of the Ni layer 487 and the Cu layer 488 is prepared. More specifically, an Ni plate (not shown) having a prescribed thickness and a Cu plate (not shown) having a prescribed thickness are prepared. Then, the Ni plate and the Cu plate are pressure-bonded to each other in a superposed state. Thereafter a bond material of the Ni plate and the Cu plate is retained under a temperature condition of at least about 700° C. and not more than about 800° C. in a hydrogen atmosphere for at least about 10 seconds and not more than about 3 minutes. Thereafter diffusion annealing is performed by gradually cooling the bond material of the Ni plate and the Cu plate. Then, heat treatment is performed again under the temperature condition of at least about 700° C. and not more than about 800° C. and the bond material of the Ni plate and the Cu plate is rolled, whereby the first clad material having the two-layer structure of the Ni layer 487 and the Cu layer 488 shown in FIG. 12 is prepared. Thereafter the Ni-plated layer 489 is formed on the side of the Cu layer 488 opposite to the Ni layer 487.

Then, the first clad material provided with the Ni-plated layer 489 is pressure-bonded to a groove portion of an Al plate so that the bottom surface of the groove portion of the Al plate (not shown) and the Ni layer 487 are opposed to each other, through a manufacturing process similar to that in the first embodiment. Thus, the bond region 484 is formed on the bond interface between the Ni layer 487 of the terminal connecting layer 481 and the bottom surface of the groove portion 82, as shown in FIG. 13. As a result of this, a second clad material in which the Al layer 80 made of Al and the terminal connecting layer 481 are pressure-bonded to each other is formed in a state where the terminal connecting layer 481 is embedded in the groove portion 82. Thereafter the negative-electrode terminal 408 is manufactured through a manufacturing process similar to that in the first embodiment.

Then, the negative-electrode terminal 408 and the negative-electrode columnar portion 52 of a negative electrode portion 5 are welded to each other by resistance welding, as shown in FIG. 12. At this time, electricity is converted to heat in the Ni-plated layer 489 made of Ni larger in electrical resistance than Cu, whereby the temperature of the welded portion rises and the welded portion is melted. Thus, the weld portion 486 is formed on the welded portion between the terminal connecting layer 481 and the Ni-plated layer 52a of the negative-electrode columnar portion 52. As a result of this, the negative-electrode terminal 408 and the negative-electrode portion 5 are connected with each other. The manufacturing process for the lithium ion cell employing the negative-electrode terminal 408 according to the second embodiment is substantially similar to that in the aforementioned first embodiment.

According to the second embodiment, as hereinabove described, the terminal connecting layer 481 including the Ni layer 487 made of Ni and the Cu layer 488 made of Cu is bonded to the Al layer 80 in the region B to which a bus bar 101 made of Al is not welded, whereby an intermetallic compound containing Al and Ni can be inhibited from being excessively formed on the bond region 484 between the Al layer 80 and the terminal connecting layer 481 due to heat at a time when the negative-electrode terminal 408 and the bus bar 101 are resistance-welded to each other. As a result of this, separation between the Al layer 80 and the terminal connecting layer 481 can be rendered hard to take place.

According to the second embodiment, the terminal connecting layer 481 connected with the negative-electrode columnar portion 52 includes the clad material of the two-layer structure in which the Ni layer 487 made of Ni and the Cu layer 488 made of Cu are pressure-bonded to each other, whereby the Al layer 80 and the terminal connecting layer 481 can be strongly bonded to each other due to the Ni layer 487 of the terminal connecting layer 481. Further, the electrical resistance of the terminal connecting layer 481 can be reduced due to the Cu layer 488 of the terminal connecting layer 481, while the terminal connecting layer 481 and the negative-electrode columnar portion 52 can be connected with each other by resistance welding under a lower temperature condition.

According to the second embodiment, the terminal connecting layer 481 includes the clad material of the two-layer structure in which the Ni layer 487 and the Cu layer 488 are pressure-bonded to each other so that no Cu is arranged on the bond region 484 between the Al layer 80 and the terminal connecting layer 481, whereby a bond structure of Al and Cu smaller in bond strength than a bond structure of Al and Ni can be inhibited from being formed. Further, the Ni layer 487 and the Cu layer 488 made of different metallic materials can be strongly bonded to each other.

According to the second embodiment, the terminal connecting layer 481 consists of the clad material of the two-layer structure in which the Ni layer 487 and the Cu layer 488 are pressure-bonded to each other and the Ni-plated layer 489 formed on the upper surface 481a (surface on the Z1 side) on the side of the Cu layer 488 opposite to the Ni layer 487, whereby the welded portion can be easily made to generate heat due to the Ni-plated layer 489 larger in electrical resistance than the Cu layer 488. Thus, the terminal connecting layer 481 and the negative-electrode portion 5 can be easily connected with each other by resistance welding. Further, the Cu layer 488 can be inhibited from being corroded, due to the Ni-plated layer 489 having corrosion resistance. In addition, the Ni-plated layer 489 may be formed with the minimum necessary thickness capable of easily making the welded portion generate heat and capable of inhibiting the Cu layer 488 from being corroded, whereby the quantity of use of Ni can be reduced.

According to the second embodiment, the thickness t8 of the Cu layer 488 is rendered larger than the thickness t7 of the Ni layer 487 so that the thickness t7 of the Cu layer 488 made of Cu smaller in electrical resistance and lower in melting point than Ni constituting the Ni layer 487 can be enlarged, whereby the electrical resistance of the terminal connecting layer 481 can be easily reduced, while the terminal connecting layer 481 and the negative-electrode portion 5 can be connected with each other by resistance welding under a low temperature condition. The remaining effects of the second embodiment are similar to those of the aforementioned first embodiment.

Third Embodiment

The structure of a negative-electrode terminal 508 according to a third embodiment of the present invention is now described with reference to FIGS. 5, 14 and 15. In this negative-electrode terminal 508 according to the third embodiment, a case where a terminal connecting layer 581 consists of a clad material (clad portion) of a three-layer structure in which an Ni layer 587a, a Cu layer 588 and an Ni layer 587b are bonded to each other dissimilarly to the aforementioned first embodiment is described. The negative-electrode terminal 508 is an example of the "negative-electrode terminal for a cell" in the present invention.

Figure 14:
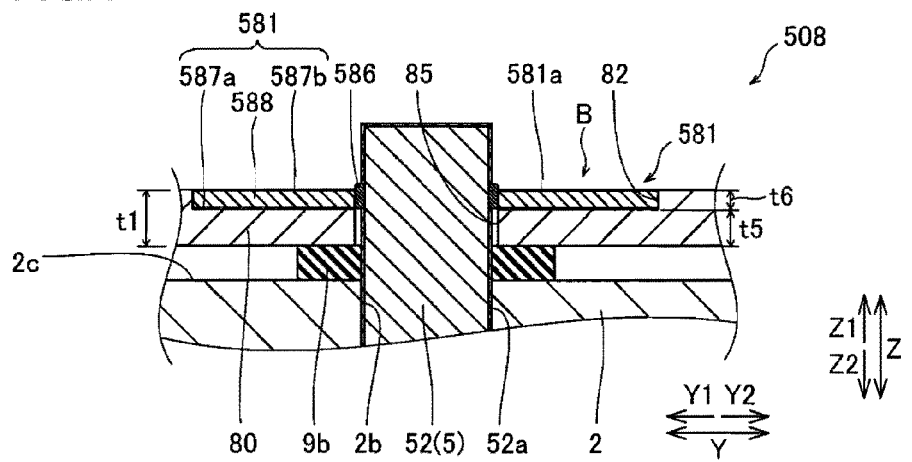
FIG. 14 An enlarged sectional view around a negative-electrode terminal according to a third embodiment of the present invention.

The negative-electrode terminal 508 according to the third embodiment of the present invention consists of a clad material in which an Al layer 80 made of Al and the terminal connecting layer 581 including the clad material of the three-layer structure are pressure-bonded to each other, as shown in FIG. 14. The terminal connecting layer 581 is embedded in a groove portion 82 of the Al layer 80 formed in a region B different from a bus bar bonding portion 83 (see FIG. 5). In the region B, the thickness t5 of the Al layer 80 is at least about 0.9 mm and not more than about 1.4 mm, and the thickness t6 of the terminal connecting layer 581 is at least about 0.4 mm and not more than about 0.9 mm. The terminal connecting layer 581 is an example of the "second metal layer" in the present invention.

According to the third embodiment, the terminal connecting layer 581 consists of the clad material of the three-layer structure in which the Ni layer 587a made of Ni, the Cu layer 588 made of Cu and the Ni layer 587b made of Ni are pressure-bonded to each other. In a state where the terminal connecting layer 581 is arranged in the groove portion 82 of the Al layer 80, the Ni layer 587a of the terminal connecting layer 581 is arranged on a bottom surface side (Z2 side) of the groove portion 82 of the Al layer 80, while the Ni layer 587b is arranged on a side (Z1 side) of the Cu layer 588 opposite to the Ni layer 587a. The Ni layer 587b is formed to be exposed on an upper surface 581a (surface on the Z1 side) of the terminal connecting layer 581. The Ni layer 587a is an example of the "third metal layer" in the present invention, the Cu layer 588 is an example of the "fourth metal layer" in the present invention, and the Ni layer 587b is an example of the "fifth metal layer" in the present invention.

Figure 15:
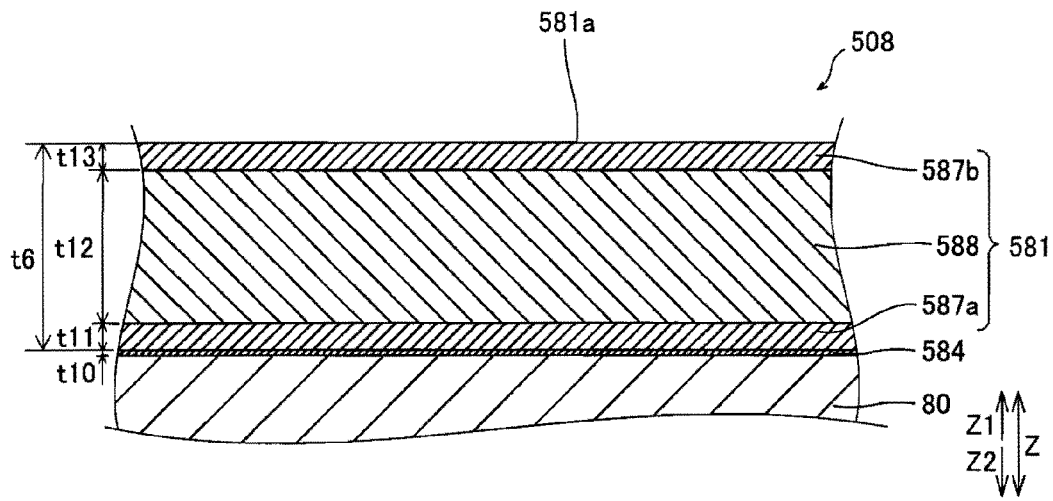
FIG. 15 An enlarged sectional view around a bond region according to the third embodiment of the present invention.

As shown in FIG. 15, the thickness t11 of the Ni layer 587a is at least about 0.01 mm and not more than about 0.1 mm, the thickness t12 of the Cu layer 588 is at least about 0.2 mm and not more than about 0.88 mm, and the thickness t13 of the Ni layer 587b is at least about 0.01 mm and not more than about 0.1 mm. In other words, the thickness t12 of the Cu layer 588 is larger than the thickness t11 of the Ni layer 587a and the thickness t13 of the Ni layer 587b, and at least the total thickness (at least about 0.02 mm and not more than about 0.2 mm) of the thickness t11 of the Ni layer 587a and the thickness t13 of the Ni layer 587b. The thickness t11 of the Ni layer 587a and the thickness t13 of the Ni layer 587b are at least about 1% and not more than about 50% of the thickness t12 of the Cu layer 588, and at least about 0.6% and not more than about 5.6% of the thickness t1 (=t5+t6=about 1.8 mm, see FIG. 14) of the negative-electrode terminal 508 respectively.

A bond region 584 in which Al in the Al layer 80 and Ni in the Ni layer 587a are diffusion-bonded to each other is formed on a bond interface between the Ni layer 587a of the terminal connecting layer 581 and the bottom surface (surface on the Z2 side) of the groove portion 587a. This bond region 584 is formed when pressure-bonding and diffusion-annealing the Al layer 80 and the terminal connecting layer 581. The thickness t10 of the bond region 584 is at least about 1 μm and not more than about 5 μm.

As shown in FIG. 14, a weld portion 586 is formed on a welded portion between the terminal connecting layer 581 and an Ni-plated layer 52a of a negative-electrode columnar portion 52. The remaining structure of the negative-electrode terminal 508 according to the third embodiment is substantially similar to that in the aforementioned first embodiment.

A manufacturing process for a lithium ion cell employing the negative-electrode terminal 508 according to the third embodiment of the present invention is now described with reference to FIGS. 14 and 15.

First, a first clad material consisting of the three-layer structure of the Ni layer 587a, the Cu layer 588 and the Ni layer 587b is prepared. More specifically, two Ni plates (not shown) having prescribed thicknesses and a Cu plate (not shown) having a prescribed thickness are prepared. Then, the Ni plate, the Cu plate and the Ni plate are pressure-bonded to each other in a state superposed with each other in this order. Thereafter a bond material of Ni/Cu/Ni is retained under a temperature condition of at least about 700° C. and not more than about 800° C. in a hydrogen atmosphere for at least about 10 seconds and not more than about 3 minutes. Thereafter diffusion annealing is performed by gradually cooling the bond material of Ni/Cu/Ni. Then, heat treatment is performed again under the temperature condition of at least about 700° C. and not more than about 800° C. and the bond material of Ni/Cu/Ni is rolled, whereby the first clad material having the three-layer structure of the Ni layer 587a, the Cu layer 588 and the Ni layer 587b shown in FIG. 14 is prepared.

Then, the first clad material having the three-layer structure is pressure-bonded to a groove portion of an Al plate so that the bottom surface of the groove portion of the Al plate (not shown) and the Ni layer 587a are opposed to each other, through a manufacturing process similar to that in the first embodiment. Thus, the bond region 584 is formed on the bond interface between the Ni layer 587a of the terminal connecting layer 581 and the bottom surface of the groove portion 82, as shown in FIG. 15. As a result of this, a second clad material in which the Al layer 80 made of Al and the terminal connecting layer 581 are pressure-bonded to each other is formed in a state where the terminal connecting layer 581 is embedded in the groove portion 82. Thereafter the negative-electrode terminal 508 is manufactured through a manufacturing process similar to that in the first embodiment.

Then, the negative-electrode terminal 508 and the negative-electrode columnar portion 52 of a negative-electrode portion 5 are welded to each other by laser welding, as shown in FIG. 14. At this time, electricity is converted to heat in the Ni layer 587b made of Ni easily generating heat by absorbing a laser beam, whereby the temperature of the welded portion rises and the welded portion is melted. Thus, the weld portion 586 is formed on the welded portion between the terminal connecting layer 581 and the Ni-plated layer 52a of the negative-electrode columnar portion 5. As a result of this, the negative-electrode terminal 508 and the negative-electrode portion 5 are connected with each other. The manufacturing process for the lithium ion cell employing the negative-electrode terminal 508 according to the third embodiment is similar to that in the aforementioned first embodiment.

According to the third embodiment, as hereinabove described, the terminal connecting layer 581 including the Ni layers 587a and 587b made of Ni and the Cu layer 588 made of Cu is bonded to the Al layer 80 in the region B to which a bus bar 101 made of Al is not welded, whereby an intermetallic compound containing Al and Ni can be inhibited from being excessively formed on the bond region 584 between the Al layer 80 and the terminal connecting layer 581 due to heat at a time when the negative-electrode terminal 508 and the bus bar 101 are resistance-welded to each other. As a result of this, separation between the Al layer 80 and the terminal connecting layer 581 can be rendered hard to take place.

According to the third embodiment, the terminal connecting layer 581 connected with the negative-electrode columnar portion 52 consists of the clad material of the three-layer structure in which the Ni layer 587a made of Ni, the Cu layer 588 made of Cu and the Ni layer 587b made of Ni are pressure-bonded to each other, whereby the Al layer 80 and the terminal connecting layer 581 can be strongly bonded to each other due to the Ni layer 587a of the terminal connecting layer 581. Further, the electrical resistance of the terminal connecting layer 581 can be reduced due to the Cu layer 588 of the terminal connecting layer 581, while the terminal connecting layer 581 and the negative-electrode columnar portion 52 can be connected with each other by laser welding under a lower temperature condition. In addition, the Cu layer 588 can be inhibited from being corroded, due to the Ni layer 587b, having corrosion resistance, of the terminal connecting layer 581.

According to the third embodiment, the terminal connecting layer 581 consists of the clad material of the three-layer structure in which the Ni layer 587a made of Ni, the Cu layer 588 made of Cu and the Ni layer 587b made of Ni are pressure-bonded to each other so that Cu is not arranged on the bond region 584 between the Al layer 80 and the terminal connecting layer 581, whereby a bond structure of Al and Cu smaller in bond strength than a bond structure of Al and Ni can be inhibited from being formed. Further, the Ni layer 587a, the Cu layer 598 and the Ni layer 587b made of different metallic materials can be strongly bonded to each other. In addition, light can be absorbed in a large quantity in the Ni layer 587b smaller in laser beam reflectance than the Cu layer 588, whereby the welded portion can be easily made to generate heat due to the Ni layer 587b. Thus, the terminal connecting layer 581 and the negative-electrode portion 5 can be easily connected with each other by laser welding. Further, the three-layer structure consisting of the Ni layer 587a, the Cu layer 588 and the Ni layer 587b can be formed through one bonding step, whereby the negative-electrode terminal 508 can be easily prepared.

According to the third embodiment, the thickness t12 of the Cu layer 588 is rendered larger than the thickness t11 of the Ni layer 587a and the thickness t13 of the Ni layer 587b and rendered at least the total thickness of the thickness t11 of the Ni layer 587a and the thickness t13 of the Ni layer 587b so that the thickness t12 of the Cu layer 588 made of Cu smaller in electrical resistance and lower in melting point than Ni constituting the Ni layers 587a and 587b can be enlarged, whereby the electrical resistance of the terminal connecting layer 581 can be easily reduced, while the terminal connecting layer 581 and the negative-electrode portion 5 can be easily connected with each other by laser welding. The remaining effects of the third embodiment are substantially similar to those of the aforementioned first embodiment.

The embodiments and Examples disclosed this time must be considered illustrative in all points and not restrictive. The range of the present invention is shown not by the above description of the embodiments and Examples but by the scope of claims for patent, and all modifications within the meaning and range equivalent to the scope of claims for patent are included.

Figure 16:
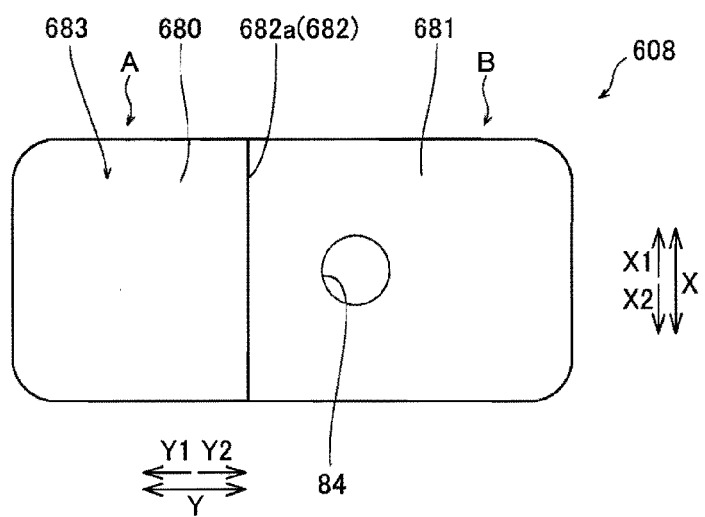
FIG. 16 A top plan view of a negative-electrode terminal according to a modification of the first embodiment of the present invention.

For example, while the example in which the negative-electrode terminal 8 consists of the clad material (clad portion) of such a shape (inlay shape) that the Ni—Cu alloy layer 81 is not exposed on both end portions of the Al layer 80 in the Y direction has been shown in the aforementioned first embodiment, the present invention is not restricted to this. According to the present invention, a negative-electrode terminal 608 may be configured to consist of a clad material of a shape (edgelay shape) not exposing an Ni—Cu alloy layer 681 on a Y1-side end portion of an Al layer 680 while exposing the same on a Y2-side end portion, as a modification shown in FIG. 16. At this time, a notch portion 682 having a Y1-side inner side surface 682a while not having a Y2-side inner side surface may be formed in the Al layer 680, in place of the groove portion 82 in the aforementioned first embodiment. Thus, a mask for the Al layer 680 may be formed only on one side (Y1 side) of the Ni—Cu alloy layer 681 as compared with a clad material of an inlay shape in a case of forming the mask on the surface of the Al layer 680 and working only the surface of the Ni—Cu alloy layer 681, for example, whereby it is possible to easily work only the surface of the Ni—Cu alloy layer 681. The negative-electrode terminal 608 is an example of the "negative-electrode terminal for a cell" in the present invention. The Al layer 680 and the Ni—Cu alloy layer 681 are examples of the "first metal layer" and the "second metal layer" in the present invention respectively.

While the example of connecting the Al layer 80 made of Al and the bus bar 101 made of Al with each other by resistance welding has been shown in each of the aforementioned first to third embodiments, the present invention is not restricted to this. According to the present invention, the Al layer 80 made of Al and the bus bar 101 made of Al may be connected with each other by TIG (Tungsten Inert Gas) welding. At this time, heat in welding is more easily applied to the Al layer 80 as compared with the resistance welding in which heat is locally applied. Therefore, it is possible to more remarkably attain such an effect of the present invention that the Al layer 80 and a second metal layer can be inhibited from separating from each other by arranging the second metal layer containing Ni and Cu to be stacked on the Al layer 80 in the region B of the Al layer 80.

While the example of connecting the negative-electrode terminal 8 (508) and the negative-electrode columnar portion 52 with each other by laser welding has been shown in each of the aforementioned first and third embodiments and the example of connecting the negative-electrode terminal 408 and the negative-electrode columnar portion 52 with each other by resistance welding has been shown in the aforementioned second embodiment, the present invention is not restricted to these. According to the present invention, the negative-electrode terminal and the negative-electrode columnar portion may be connected with each other by ultrasonic welding.

While the example in which the terminal connecting layer 481 includes the clad material (clad portion) of the two-layer structure in which the Ni layer 487 and the Cu layer 488 are pressure-bonded to each other has been shown in the aforementioned second embodiment and the example in which the terminal connecting layer 581 consists of the clad material (clad portion) of the three-layer structure in which the Ni layer 587a, the Cu layer 588 and the Ni layer 587b are pressure-bonded to each other has been shown in the aforementioned third embodiment, the present invention is not restricted to these. According to the present invention, the terminal connecting layer may include a clad material of at least four layers. Further, an Ni—Cu alloy layer, an Ni alloy layer, a Cu alloy layer or the like may be included as a layer constituting the clad material. In addition, the terminal connecting layer may not be a clad material in a case where the terminal connecting layer (second metal layer) has a multi-layer structure containing Ni and Cu.

DESCRIPTION OF REFERENCE SIGNS 1 lithium ion cell (cell)
2 lid member (lid of cell case)
5 negative-electrode portion (cell negative electrode)
7 positive-electrode terminal (cell terminal)
8, 408, 508, 608 negative-electrode terminal (negative-electrode terminal for cell, cell terminal)
80, 680 Al layer (first metal layer)
81, 681 Ni—Cu alloy layer (second metal layer)
82 groove portion
101 bus bar (cell terminal connecting plate)
481, 581 terminal connecting layer (second metal layer)
487, 587a Ni layer (third metal, layer)
488, 588 Cu layer (fourth metal layer)
489 Ni-plated layer
587b Ni layer (fifth metal layer)
682 notch portion

The invention claimed is:

1. A negative-electrode terminal for a cell comprising a clad portion formed by bonding a first metal layer made of Al or an Al alloy and a second metal layer containing Ni and Cu and consisting of one or a plurality of layers to each other, wherein
    the first metal layer includes a connected region connected with a cell terminal connecting plate for connecting cell terminals of a plurality of cells with each other and a stacked region adjacent to the connected region on the side of the same surface
    the second metal layer is bonded to the first metal layer in the stacked region, and configured to be connectable to cell negative electrodes of the cells, and
    the second metal layer is stacked on the first metal layer in the stacked region which is separate from the connected region, in a direction in which the cell negative electrodes extend.

2. The negative-electrode terminal for a cell according to claim 1, wherein the first metal layer is configured to be connectable to the cell terminal connecting plate made of Al or an Al alloy, and the second metal layer is configured to be connectable to the cell negative electrodes made of Cu or a Cu alloy.

3. The negative-electrode terminal for a cell according to claim 1, wherein the connected region and the stacked region of the first metal layer are arranged on a side opposite to the cells.

4. The negative-electrode terminal for a cell according to claim 1, wherein the second metal layer is arranged to extend in the stacked region from one end portion up to another end portion in a second direction orthogonal to a first direction in which the connected region and the stacked region are adjacent to each other on the same surface.

5. The negative-electrode terminal for a cell according to claim 1, wherein the second metal layer is constituted of an Ni—Cu alloy layer containing Ni and Cu.

6. The negative-electrode terminal for a cell according to claim 5, wherein the content of Ni in the Ni—Cu alloy layer of the second metal layer is at least 2 mass %.

7. The negative-electrode terminal for a cell according to claim 6, wherein the content of Ni in the Ni—Cu alloy layer of the second metal layer is at least 10 mass %.

8. The negative-electrode terminal for a cell according to claim 1, wherein the second metal layer includes a clad portion at least having a third metal layer made of Ni and a fourth metal layer made of Cu, and the third metal layer is arranged on a bonded portion to the first metal layer.

9. The negative-electrode terminal for a cell according to claim 8, wherein the thickness of the fourth metal layer is larger than the thickness of the third metal layer.

10. The negative-electrode terminal for a cell according to claim 8, wherein the second metal layer consists of the clad portion having the third metal layer and the fourth metal layer and an Ni-plated layer formed on a side of the fourth metal layer opposite to the third metal layer.

11. The negative-electrode terminal for a cell according to claim 8, wherein the second metal layer consists of the clad portion having the third metal layer and the fourth metal layer as well as a fifth metal layer made of Ni arranged on a side of the fourth metal layer opposite to the third metal layer.

12. The negative-electrode terminal for a cell according to claim 11, wherein the thickness of the fourth metal layer is larger than the thickness of the fifth metal layer.

13. The negative-electrode terminal for a cell according to claim 12, wherein the thickness of the fourth metal layer is at least the total thickness of the thickness of the third metal layer and the thickness of the fifth metal layer.

14. The negative-electrode terminal for a cell according to claim 1, wherein a groove portion is formed in the stacked region of the first metal layer, and the second metal layer is bonded to the first metal layer in a state embedded in the groove portion of the first metal layer.

15. The negative-electrode terminal for a cell according to claim 3, wherein the surface of the first metal layer in the connected region and the surface of the second metal layer bonded to the first metal layer in the stacked region are connected with each other in the form of planar surfaces.

16. The negative-electrode terminal for a cell according to claim 1, wherein the thickness of the second metal layer is not more than the thickness of the first metal layer in the stacked region.

17. The negative-electrode terminal for a cell according to claim 16, wherein the thickness of the second metal layer is at least 10% and not more than 50% of the total thickness of the thickness of the first metal layer in the stacked region and the thickness of the second metal layer.

18. The negative-electrode terminal for a cell according to claim 1, wherein the clad portion is configured, in a state insulated from lids of cell cases of the cells, to be arrangeable on the upper surfaces of the lids of the cell cases.

19. The negative-electrode terminal for a cell according to claim 1, wherein at least part of the first metal layer in the connected region is provided in the form of a planar surface to be weldable to the cell terminal connecting plate in the form of a flat plate.

20. The negative-electrode terminal for a cell according to claim 1, wherein a notch portion is formed in the stacked region of the first metal layer, and the second metal layer is bonded to the first metal layer in a state arranged in the notch portion of the stacked region.

* * * * *